US006574708B2

(12) United States Patent
Hayter et al.

(10) Patent No.: US 6,574,708 B2
(45) Date of Patent: Jun. 3, 2003

(54) SOURCE CONTROLLED CACHE ALLOCATION

(75) Inventors: Mark D. Hayter, Menlo Park, CA (US); Joseph B. Rowlands, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 67 days.

(21) Appl. No.: 09/861,186

(22) Filed: May 18, 2001

(65) Prior Publication Data

US 2002/0174299 A1 Nov. 21, 2002

(51) Int. Cl.⁷ .............................................. G06F 12/12
(52) U.S. Cl. ...................... 711/118; 711/138; 711/139; 711/144; 711/145; 711/170; 711/173
(58) Field of Search ................................ 711/118, 133, 711/134, 136, 139, 144, 145, 138, 170, 173

(56) References Cited

U.S. PATENT DOCUMENTS

| 4,433,378 | A | | 2/1984 | Leger | 710/100 |
|---|---|---|---|---|---|
| 4,463,424 | A | | 7/1984 | Mattson et al. | 711/136 |
| 4,760,571 | A | | 7/1988 | Schwarz | 370/446 |
| 5,640,399 | A | | 6/1997 | Rostoker et al. | 370/392 |
| 5,668,809 | A | | 9/1997 | Rostoker et al. | 370/392 |
| 5,778,414 | A | | 7/1998 | Winter et al. | 711/5 |
| 5,802,287 | A | | 9/1998 | Rostoker et al. | 709/250 |
| 5,829,025 | A | | 10/1998 | Mittal | 711/122 |
| 5,887,187 | A | | 3/1999 | Rostoker et al. | 712/29 |
| 5,893,150 | A | * | 4/1999 | Hagersten et al. | 711/139 |
| 5,908,468 | A | | 6/1999 | Hartmann | 710/131 |
| 5,914,955 | A | | 6/1999 | Rostoker et al. | 370/395 |
| 5,974,508 | A | | 10/1999 | Maheshwari | 711/133 |
| 6,018,763 | A | | 1/2000 | Hughes et al. | 709/213 |
| 6,098,064 | A | | 8/2000 | Pirolli et al. | 707/2 |
| 6,111,859 | A | | 8/2000 | Godfrey et al. | 370/257 |
| 6,151,662 | A | * | 11/2000 | Christie et al. | 711/134 |
| 6,157,623 | A | | 12/2000 | Kerstein | 370/315 |
| 6,202,125 | B1 | | 3/2001 | Patterson et al. | 711/118 |
| 6,202,129 | B1 | * | 3/2001 | Palanca et al. | 711/128 |
| 6,209,020 | B1 | * | 3/2001 | Angle et al. | 709/108 |
| 6,215,497 | B1 | * | 4/2001 | Leung | 345/419 |
| 6,262,594 | B1 | | 7/2001 | Cheung et al. | 326/38 |
| 6,266,797 | B1 | | 7/2001 | Godfrey et al. | 716/1 |
| 6,269,427 | B1 | * | 7/2001 | Kuttanna et al. | 711/118 |

(List continued on next page.)

FOREIGN PATENT DOCUMENTS

| WO | 00/30322 | 5/2000 |
|---|---|---|
| WO | 00/52879 | 9/2000 |

OTHER PUBLICATIONS

"ATLAS I: A Single–Chip, Gigabit ATM Switch with HIC/HS Links and Multi–Lane Back–Pressure," Katevenis, et al., IPC Business Press LTD., Long, GB, vol. 21, No. 7–8, Mar. 30, 1998, XP004123981, 5 pages.

(List continued on next page.)

Primary Examiner—T. V. Nguyen
(74) Attorney, Agent, or Firm—Lawrence J. Merkel; Meyertons, Hood, Kivlin, Kowert & Goetzel, P.C.

(57) ABSTRACT

A cache is coupled to receive an access which includes a cache allocate indication. If the access is a miss in the cache, the cache either allocates a cache block storage location to store the cache block addressed by the access or does not allocate a cache block storage location in response to the cache allocate indication. In one implementation, the cache is coupled to an interconnect with one or more agents. In such an implementation, the cache accesses may be performed in response to transactions on the interconnect, and the transactions include the cache allocate indication. Thus, the source of a cache access specifies whether or not to allocate a cache block storage location in response to a miss by the cache access. The source may use a variety of mechanisms for generating the cache allocate indication.

38 Claims, 13 Drawing Sheets

U.S. PATENT DOCUMENTS

| | | | |
|---|---|---|---|
| 6,279,087 B1 | 8/2001 | Melo et al. ................... | 711/146 |
| 6,332,179 B1 * | 12/2001 | Okpisz et al. ............... | 711/128 |
| 6,349,365 B1 | 2/2002 | McBride ...................... | 711/133 |
| 6,366,583 B2 | 4/2002 | Rowett et al. .............. | 370/401 |
| 6,373,846 B1 | 4/2002 | Daniel et al. ........... | 370/395.65 |
| 6,438,651 B1 * | 8/2002 | Slane ........................... | 710/39 |

OTHER PUBLICATIONS

"An Introductory VHDL Tutorial: Chapter 1—An Introduction and Background," 1995, Green Mountain Computing Systems, XP002212233, 2 pages.

*Pentium® Pro Family Developer's Manual,* vol. 1: Specifications, Chapter 4, pp. 1–18, 1996.

SiByte, "Target Applications," http://sibyte.com/mercurian/applications.htm, Jan. 15, 2001, 2 pages.

SiByte, "SiByte Technology," http://sibyte.com/mercurian/technology.htm, Jan. 15, 2001, 3 pages.

SiByte, "The Mercurian Processor," http://sibyte.com/mercurian, Jan. 15, 2001, 2 pages.

SiByte, "Fact Sheet," SB–1 CPU, Oct. 2000, rev. 0.1, 1 page.

SiByte, "Fact Sheet," SB–1250, Oct. 2000, rev. 0.2, 10 pages.

Stepanian, SiByte, SiByte SB–1 MIPS64 CPU Core, Embedded Processor Forum 2000, Jun. 13, 2000, 15 pages.

Jim Keller, "The Mercurian Processor: A High Performance, Power–Efficient CMP for Networking," Oct. 10, 2000, 22 pages.

Tom R. Halfhill, "SiByte Reveals 64–Bit Core For NPUs; Independent MIPS64 Design Combines Low Power, High Performance," Microdesign Resources, Jun. 2000, Microprocessor Report, 4 pages.

Intel, "Pentium Processor Family User's Manual," vol. 1: Pentium Processor Family Data Book, 1994, pp. 5–23 and 5–50.

"PowerPC 601," RISC Microprocessor User's Manual, Revision 1, Motorola, Inc. 1993, p. 8–14.

* cited by examiner

| Bit Time | 7 | 6 | 5 | 4 | 3 | 2 | 1 | 0 |
|---|---|---|---|---|---|---|---|---|
| 1 | SeqId[3:2] | | CMD[5:0] | | | | | |
| 2 | Pass PW | SeqId[1:0] | | UnitID[4:0] | | | | |
| 3 | Mask/Count[1:0] | | Compat | SrcTag[4:0] | | | | |
| 4 | Addr[7:2] | | | | | | Mask/Count[3:2] | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

130

| CMD | 5 | 4 | 3 | 2 | 1 | 0 |
|---|---|---|---|---|---|---|
| Write | P/NP | 0 | 1 | Len | Isoc | Prob |
| Read | 0 | 1 | RP PW | Len | Isoc | Prob |

132

SOURCE CONTROLLED CACHE ALLOCATION

BACKGROUND OF THE INVENTION

1. Field of the Invention

This invention is related to the field of caches and, more particularly, to allocation of space in caches.

2. Description of the Related Art

Caches are used frequently in systems to reduce the memory access latency. Typically, at any given time, caches store the most recently accessed data. For each access, the cache determines whether or not the accessed data is currently stored in the cache. If the data is stored in the cache (a cache "hit"), the cache responds to the access (updating the stored data if the access is a write, or providing the stored data if the data is a read). If the data is not stored in the cache (a cache "miss"), the data is transferred to/from memory. Generally, the cache allocates storage for the data if the access is a read. In some cases, the cache also allocates storage for the data if the access is a write.

Since the cache is finite, the allocation of storage for data which misses the cache frequently causes data currently stored in the cache to be replaced (referred to as "evicting" the stored data). If the evicted data is modified with respect to the corresponding copy of the data in memory, the cache writes the data back to the memory. Otherwise, the cache may simply overwrite the evicted data in the cache with the new data. Unfortunately, if the evicted data is accessed again at a later time, the evicted data will experience the longer memory latency instead of the shorter cache latency.

SUMMARY OF THE INVENTION

An apparatus including a cache is described. The cache is coupled to receive an access which includes a cache allocate indication. If the access is a miss in the cache, the cache either allocates a cache block storage location to store the cache block addressed by the access or does not allocate a cache block storage location in response to the cache allocate indication. In one implementation, the cache is coupled to an interconnect with one or more agents. In such an implementation, the cache accesses may be performed in response to transactions on the interconnect, and the transactions include the cache allocate indication. Thus, the source of a cache access specifies whether or not to allocate a cache block storage location in response to a miss by the cache access. The source may use a variety of mechanisms for generating the cache allocate indication. Cache allocation may be controlled on a finer grain level than if the cache allocated cache blocks in response to each cache miss. Cache pollution may be reduced.

Broadly speaking, a system is contemplated. The system comprises an agent configured to initiate a transaction addressing a first cache block and a cache coupled to receive the transaction. The cache includes a plurality of cache block storage locations for storing cache blocks. The agent is configured to transmit a cache allocate indication in the transaction, which indicates whether or not the cache is to allocate one of the plurality of cache block storage locations to store the first cache block if the transaction is a miss in the cache. If the transaction is a miss, the cache is configured to selectively allocate one of the plurality of cache block storage locations to store the first cache block responsive to the cache allocate indication.

Additionally, an apparatus is contemplated. The apparatus comprises a first circuit configured to generate a request for a transaction addressing a first cache block on an interconnect. The first circuit is further configured to determine whether or not a cache on the interconnect is to allocate a cache block storage location to store the first cache block if the first cache block is a miss in the cache. A second circuit is configured to transmit the transaction on the interconnect, the transaction including a cache allocate indication indicating whether or not a cache on the interconnect is to allocate a cache block storage location to store the first cache block if the first cache block is a miss in the cache.

Moreover, a cache is contemplated. The cache comprises a cache memory including a plurality of cache block storage locations and a control circuit coupled to receive a cache allocate indication corresponding to an access. The control circuit is configured to selectively allocate one of the plurality of cache block storage locations to store a first cache block addressed by the access, if the access misses in the cache, responsive to the cache allocate indication.

BRIEF DESCRIPTION OF THE DRAWINGS

The following detailed description makes reference to the accompanying drawings, which are now briefly described.

Figure 1:
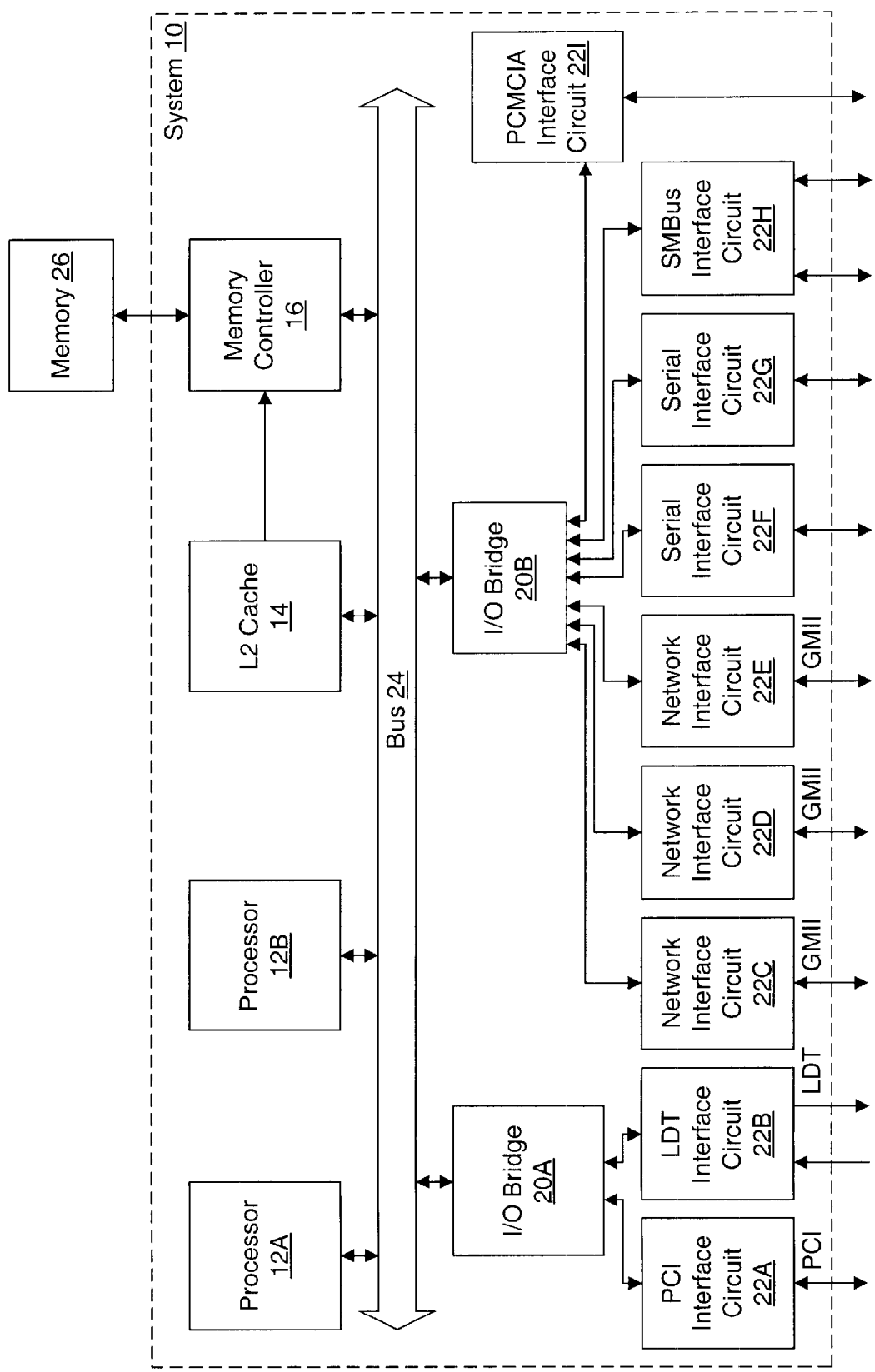
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

System Overview

Turning now to FIG. 1, a block diagram of one embodiment of a system 10 is shown. Other embodiments are possible and contemplated. In the embodiment of FIG. 1, the system 10 includes processors 12A–12B, an L2 cache 14, a memory controller 16, a pair of input/output (I/O) bridges 20A–20B, and various I/O interface circuits 22A–22I. The system 10 may include a bus 24 for interconnecting the various components of the system 10. As illustrated in FIG. 1, each of the processors 12A–12B, the L2 cache 14, the memory controller 16, and the I/O bridges 20A–20B are coupled to the bus 24. Thus, each of the processors 12A–12B, the L2 cache 14, the memory controller 16, and the I/O bridges 20A–20B may be an agent on the bus 24 for the illustrated embodiment. The I/O bridge 20A is coupled to the I/O interface circuits 22A–22B (specifically, in the illustrated embodiment, a Peripheral Component Interconnect (PCI) interface circuit 22A and a Lightning Data Transport (LDT) interface circuit 22B (where the LDT interface is now also being referred to as the HyperTransport interface), and the I/O bridge 20B is coupled to the I/O interface circuits 22C–22I (specifically, in the illustrated embodiment, three network interface circuits 22C–22E, two serial interface circuits 22F–22G, a system management bus (SMBus) Interface circuit 22H, and a Personal Computer Memory Card International Association (PCMCIA) Interface circuit 22I). The L2 cache 14 is coupled to the memory controller 16, which is further coupled to a memory 26.

The processors 12A–12B may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. While the system 10 as shown in FIG. 1 includes two processors, other embodiments may include one processor or more than two processors, as desired.

The L2 cache 14 is a high speed cache memory. The L2 cache 14 is referred to as "L2" since the processors 12A–12B may employ internal level 1 ("L1") caches. If L1 caches are not included in the processors 12A–12B, the L2 cache 14 may be an L1 cache. Furthermore, if multiple levels of caching are included in the processors 12A–12B, the L2cache 14 may be an outer level cache than L2.

While the L2 cache 14 is labeled L2 with respect to it position in the processor cache hierarchy, the L2 cache 14 may actually service cacheable transactions from any device on the bus 24. Thus, the L2 cache 14 may be viewed as part of a memory subsystem including the memory controller 16 (and the memory 26 coupled thereto). If a cacheable read transaction hits in the L2 cache 14, even if the source of the read transaction is an I/O interface circuit 22A–22I, the L2 cache 14 supplies the data for the read transaction. If a cacheable write transaction hits in the L2 cache 14, even if the source of the read transaction is an I/O interface circuit 22A–22I, the L2 cache 14 updates with the data for the read transaction.

The L2 cache 14 may employ any organization, including direct mapped, set associative, and fully associative organizations. In one particular implementation, the L2cache 14 may be a set associative cache (in general N way, N being an integer, although a specific 4 way embodiments is illustrated below) having 32 byte cache blocks. A set associative cache is a cache arranged into multiple sets, each set comprising two or more entries. A portion of the address (the "index") is used to select one of the sets (i.e. each encoding of the index selects a different set). The cache block storage locations in the selected set are eligible to store the cache block accessed by the address. Each of the cache block storage locations within the set is referred to as a "way" of the set. The portion of the address remaining after removing the index (and the offset within the cache block) is referred to as the "tag", and is stored in each cache block storage location to identify the cache block in that entry. The stored tags are compared to the corresponding tag portion of the address of a memory transaction to determine if the memory transaction hits or misses in the cache, and is used to select the way in which the hit is detected (if a hit is detected).

The memory controller 16 is configured to access the memory 26 in response to memory transactions received on bus 24. The memory controller 16 receives a hit signal from the L2 cache 14, and if a hit is detected in the L2 cache 14 for a memory transaction, memory controller 16 does not respond to that memory transaction. Other embodiments may not include the L2 cache 14 and the memory controller 16 may respond to each memory transaction. If a miss is detected by the L2 cache 14, or the memory transaction is non-cacheable, the memory controller 16 may access the memory 26 to perform the read or write operation. The memory controller 16 may be designed to access any of a variety of types of memory. For example, the memory controller 16 may be designed for synchronous dynamic random access memory (SDRAM), and more particularly double data rate (DDR) SDRAM. Alternatively, the memory controller 16 may be designed for DRAM, Rambus DRAM (RDRAM), SRAM, or any other suitable memory device.

The I/O bridges 20A–20B link one or more I/O interface circuits (e.g. the I/O interface circuits 22A–22B for the I/O bridge 20A and the I/O interface circuits 22C–22I for I/O bridge 20B) to the bus 24. While I/O interface circuits are shown in FIG. 1, generally an I/O bridge 20A–20B may link one or more I/O interface circuits or I/O devices. The I/O bridges 20A–20B may serve to reduce the electrical loading on the bus 24 if more than one I/O interface circuit 22A–22I is bridged by that I/O bridge. Generally, the I/O bridge 20A performs transactions on the bus 24 on behalf of the I/O interface circuits 22A–22B and relays transactions targeted at the I/O interface circuit 22A–22B from the bus 24 to that I/O interface circuit 22A–22B. Similarly, the I/O bridge 20B generally performs transactions on the bus 24 on behalf of the I/O interface circuits 22C–22I and relays transactions targeted at an I/O interface circuit 22C–22I from the bus 24 to that I/O interface circuit 22C–22I.

The PCI interface circuit 22A may be a circuit for interfacing to the PCI bus. In one embodiment, the PCI interface circuit 22A may the 66 MHz PCI specification version 2.2. The PCI interface circuit 22A may be configurable to be the host bridge on the PCI bus.

The LDT interface circuit 22B may be a circuit for interfacing to the LDT fabric. As mentioned above, the LDT interface is now also being referred to as the HyperTransport interface, developed by Advanced Micro Devices, Inc. The interface will be referred to herein as LDT, but is intended to refer to the HyperTransport interface as well. The LDT interface circuit 22B may be the host bridge on the LDT fabric.

The network interface circuits 22C–22E may each include Ethernet Media Access Controllers (MACs), in one embodiment. Thus, the network interface circuits 22C–22E may interface externally to the Media Independent Interface (MII) or the Gigabit MII (GMII) interface. Alternatively, the external interface may be a generic packet interface in which either the start or end of packets is flagged using control signals on the interface. In yet another alternative, the three network interface circuits 22C–22E may be operable as two wider packet interfaces (e.g. 16 bit interfaces, if the individual MII/GMII interfaces are 8 bits). The network interface circuits 22C–22E may be configurable (e.g. during reset) to operate the interface in any of the above modes. The network interface circuits 22C–22E may alternatively include the physical portion of the Ethernet interface and interface directly to an Ethernet physical medium (e.g. twisted pair, fiber optic, etc.). Still further, other embodiments may support any network interface (e.g. X.25, Frame Relay, Asynchronous Transfer Mode (ATM), etc.).

The serial interface circuits 22F–22G may support dual serial interfaces. The serial interfaces may be operated synchronously, and may also include a dual universal asynchronous receiver/transmitter (DUART) for dual asynchronous operation. The SMBus Interface circuit 22H supports the SMBus interface, and the PCMCIA interface circuit 22I supports the PCMCIA interface. Additionally, a generic bus and general purpose I/O may be supported (not shown).

While a specific set of I/O interface circuits 22A–22I are shown, other embodiments may use any subsets or supersets of the set shown. Furthermore, other embodiments may include any set of I/O interface circuits/devices, as desired.

The bus 24 may be a split transaction bus, in one embodiment. The bus 24 may employ a distributed arbitration scheme, in one embodiment. In one embodiment, the bus 24 may be pipelined. The bus 24 may employ any suitable signalling technique. For example, in one embodiment, differential signalling may be used for high speed signal transmission. Other embodiments may employ any other signalling technique (e.g. TTL, CMOS, GTL, HSTL, etc.).

It is noted that the system 10 (and more particularly the processors 12A–12B, the L2 cache 14, the memory controller 16, the I/O interface circuits 22A–22I, the I/O bridges 20A–20B and the bus 24) may be integrated onto a single integrated circuit as a system on a chip configuration. In another configuration, the memory 26 may be integrated as well. Alternatively, one or more of the components may be implemented as separate integrated circuits, or all components may be separate integrated circuits, as desired. Any level of integration may be used.

It is noted that, while the illustrated embodiment employs a split transaction bus with separate arbitration for the address and data buses, other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, bus 24 may not be pipelined, if desired.

It is noted that, while FIG. 1 illustrates the I/O interface circuits 22A–22I coupled through the I/O bridges 20A–20B to the bus 24, other embodiments may include one or more I/O interface circuits directly coupled to the bus 24, if desired.

As used herein, the term transaction refers to a communication between two or more agents on an interconnect (e.g. the bus 24). An agent initiating the transaction may be the requesting agent or source, and an agent responding to the transaction is a responding agent or target. The term "memory transaction" refers to a communication between a device and the memory system. The memory transaction includes an address identifying a storage location in the memory. In the illustrated embodiment, the memory transaction is transmitted on the bus 24 to the memory controller 16 (and may be serviced by the L2 cache 14 instead of the memory controller 16). Memory transactions may include read transactions (a transfer of data from memory to the device) and write transactions (a transfer of data from the device to memory). More generally, a read transaction may be a transfer of data from a target of the transaction to the source (or initiator) of the transaction and a write transaction may be a transfer of data from a source of the transaction to the target of the transaction.

While a shared bus is used in the present embodiment, any sort of interconnect may be used in other embodiments (e.g. crossbar connections, point to point connections in a ring, star, or any other topology, meshes, cubes, etc.). Generally, an interconnect is any sort of communication medium.

Source Controlled Cache Allocation

Instead of allocating cache block storage locations for each transaction which misses, the L2 cache 14 may support source controlled cache allocation. The source (requesting agent) of each transaction may supply a cache allocate indication in the transaction which indicates whether or not the L2 cache 14 is to allocate a cache block storage location to store a cache block transferred in the transaction. More specifically, the cache allocate indication may be placed in one of at least two states. The first state may indicate that the L2 cache 14 is to allocate a cache block storage location for the cache block, and the second state may indicate that the L2 cache is not to allocate a cache block storage location for the cache block. Depending on the type of interconnect, the indication may be transmitted in any of a variety of ways. The bus 24 will be used as an example below, and the indication may be transmitted as a signal on the bus (e.g. during the address phase). If the interconnect is packet-based, the indication could be included in the packet.

The L2 cache 14 may use the cache allocate indication from a transaction to determine whether or not to allocate a cache block storage location to store the cache block addressed by the transaction. In this manner, the source of the transaction may control allocation of cache storage. The source may cause allocation for cache blocks that may likely be reaccessed in the near future, and may not cause allocation for cache blocks that are less likely to be reaccessed. Several example uses are described in more detail below.

In one embodiment, the cache allocate indication may affect operation of the L2cache 14 if a miss is detected for a transaction. If the transaction hits in the L2 cache 14, the L2 cache 14 may respond to the transaction (e.g. provide data for the transaction if the transaction is a read, or update the hitting cache block storage location with the data from the transaction, if the transaction is a write). In one embodiment, the bus 24 supports the supplying of data (e.g. for a read transaction) by an agent which has exclusive ownership of the data for coherent transactions (e.g. exclusive or modified in the Modified, Shared, Exclusive, Invalid (MESI) cache coherency protocol). The L2 cache 14 may inhibit responding to coherent transactions for which an agent provides an exclusive coherency response during the response phase of the corresponding transaction.

In one embodiment, the bus 24 may support both cacheable and non-cacheable transactions. A cacheable transaction is one in which the receiver of data is permitted to cache the data for later reuse, whereas a non-cacheable transaction the receiver of the data may not cache the data for later reuse. In such an embodiment, the L2 cache 14 may respond only to cacheable transactions (and may only allocate cache block storage locations in response to the cache allocate indication for cacheable transactions).

As used herein, the term "cache block" refers to a set of contiguous bytes which is the unit of allocation and deallocation of space in a cache. The cache block may be of any size. For example, in one embodiment, the cache block may be 32 bytes. Other embodiments may support larger or smaller cache block sizes (e.g. 64 bytes, 128 bytes, 16 bytes, etc.). The term "cache block storage location" refers to a storage location in the cache which is capable of storing one cache block (and may also store the associated identifying information such as the tag, a valid bit, etc.).

Figure 2:
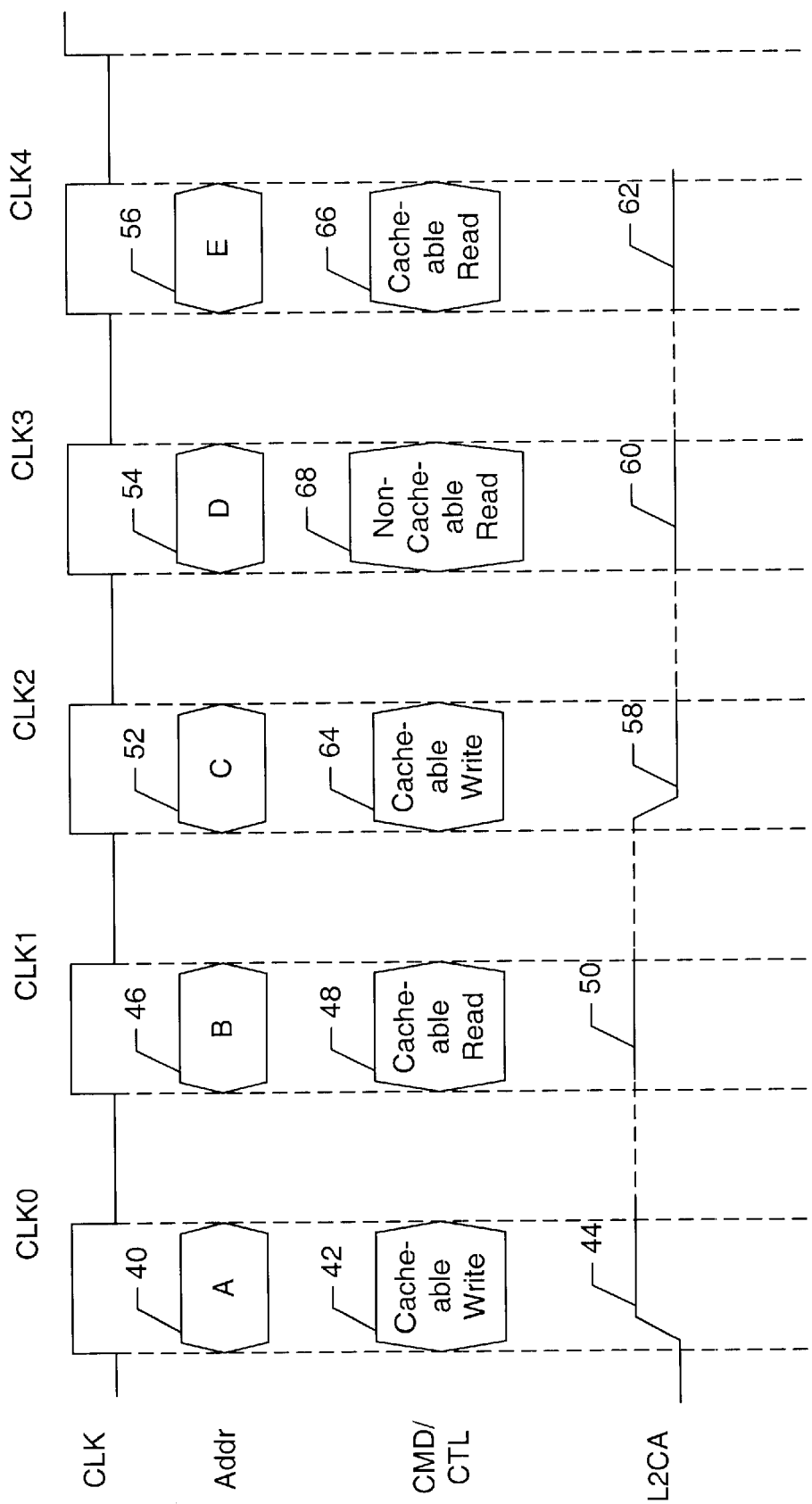
FIG. 2 is a timing diagram illustrating transactions on a bus shown in FIG. 1, including a cache allocate signal.

Turning now to FIG. 2, a timing diagram illustrating several address phases of transactions performed on the bus 24 according to one embodiment of the bus 24 is shown. Several clock cycles of the clock signal CLK corresponding to the bus 24 are shown. Each clock cycle is labeled at the top of FIG. 2 (CLK0, CLK1, etc.). Phases of the clock cycles are delimited by vertical dashed lines.

FIG. 2 illustrates an example of five transactions and the use of one embodiment of a cache allocate indication (the L2CA signal shown in FIG. 2). The L2CA signal will be used as an example below, although other transmissions of the cache allocate indication may be used in other embodiments (e.g. as mentioned above). The addresses transmitted during the address phases of the five transactions are illustrated horizontally across from the label "Addr". The command for the transaction is illustrated horizontally across from the label "CMD". Finally, the L2CA signal is illustrated horizontally across from the label "L2CA". The L2CA is illustrated as asserted high and deasserted low for this embodiment.

For this example, the agents initiating the first two transactions assert the L2CA signal, thus indicating that the L2 cache 14 is to allocate a cache block storage location to store the cache blocks addressed by the first two transactions, if those transactions are misses in the L2 cache 14. On the other hand, the agents initiating the remaining three transactions deassert the L2CA signal. Accordingly, the cache blocks addressed by the remaining three transactions are not allocated into the L2 cache 14 if those transactions miss in the L2 cache 14. Different agents may be the sources of the transactions shown in FIG. 2, or the same agent may be the source of two or more of the transactions.

The first transaction is to address "A" in FIG. 2 (reference numeral 40). The command/control signals transmitted during the address phase identify the transaction as a cacheable write (reference numeral 42). It is noted that the L2CA signal is also a control signal transmitted during the address phase, even thought the L2CA signal is shown separately. Any set of command/control signals may be used. For example, a set of command signals may be encoded to indicate the type of transaction. Additional control signals may indicate cacheability. A tag may be included to allow for out of order data phases with respect to the corresponding address phases. For non-cacheable transactions, a set of byte enables may be supplied to indicate which bytes are read/written for a given transaction. Cacheable transactions may transfer a cache block. The L2CA signal is asserted for the first transaction (reference numeral 44), as mentioned above, indicating that the L2 cache 14 is to allocate a cache block storage location to store the cache block addressed by address A if address A is a miss in the L2 cache 14.

Similarly, the second transaction (a cacheable read transaction to address "B", reference numerals 46 and 48) has the L2CA signal asserted (reference numeral 50). If the address B is a miss in the L2 cache 14, the L2 cache 14 may allocate a cache block storage location to store the cache block addressed by address B.

The remaining three transactions (to addresses "C", "D", and "E" at reference numerals 52, 54, and 56, respectively) are not to be allocated in the L2 cache 14. Thus, the L2CA signal is deasserted for these transactions (reference numerals 58, 60, and 62, respectively). If the addresses C and E (a cacheable write and a cacheable read, respectively, reference numerals 64 and 66) hit in the L2 cache 14, the L2 cache 14 updates with the cache block or supplies the cache block. However, if the addresses miss in the L2 cache, the cache blocks are not allocated into the L2 cache 14. The fourth transaction (to address D) is a non-cacheable read (reference numeral 68). For this case, the L2 cache 14 may not respond to the transaction (e.g. the L2 cache 14 may not even look up the address D in the cache memory). Additionally, the L2 cache 14 does not allocate in response to the non-cacheable transaction. The L2CA signal may be a don't care for non-cacheable transactions, if desired, or may be required to be deasserted in non-cacheable transactions.

Accordingly, after the five transactions illustrated in FIG. 2 have completed (assuming no additional transactions and that the addresses A through E map to different cache block storage locations in the L2 cache 14), cache blocks corresponding to addresses A and B would be cached. Addresses C and E may be cached, if cached prior to clock cycle CLK0, but are not allocated in response to the transactions illustrated in FIG. 2. Since address D is non-cacheable, it should not be cached.

It is noted that, in the illustrated embodiment, address phases occur during a phase of the clock signal CLK (e.g. during the high phase of the clock signal, although the low phase may be used). For the illustrated embodiment, signals on the bus 24 may be driven during one phase of the clock cycle and the other phase may be idle. More particularly, the other phase may be used to precharge the differential signal lines, in one embodiment. Thus, agents may drive the signal lines responsive to one edge of the clock signal CLK (e.g. the rising edge) and may sample the signal lines responsive to the falling edge. Other embodiments may drive and sample responsive to the same edge, like many external buses, or may drive and sample on both edges of the clock, like source synchronous designs. The L2CA signal is shown as dotted during the low phase of the clock in FIG. 2 to indicate that it is not being actively driven during this phase (and may be being precharged).

It is noted that only address phases of the transactions are illustrated in FIG. 2. Generally, the read and write transactions may have an address phase and a data phase on the bus 24. Additionally, for coherent embodiments, a response phase may follow the address phase and may be used for coherent agents to report coherency status.

It is noted that a signal may be defined to be asserted when driven to a first voltage representing a logical one, or alternatively when driven to a second voltage representing a logical zero. The signal may be defined to be deasserted when driven to the level opposite of the asserted level. In embodiments in which differential signalling is used, the signal is asserted when a first of the differential pair is lower than the second, and is deasserted when the second of the differential pair is lower than the first.

Figure 3:
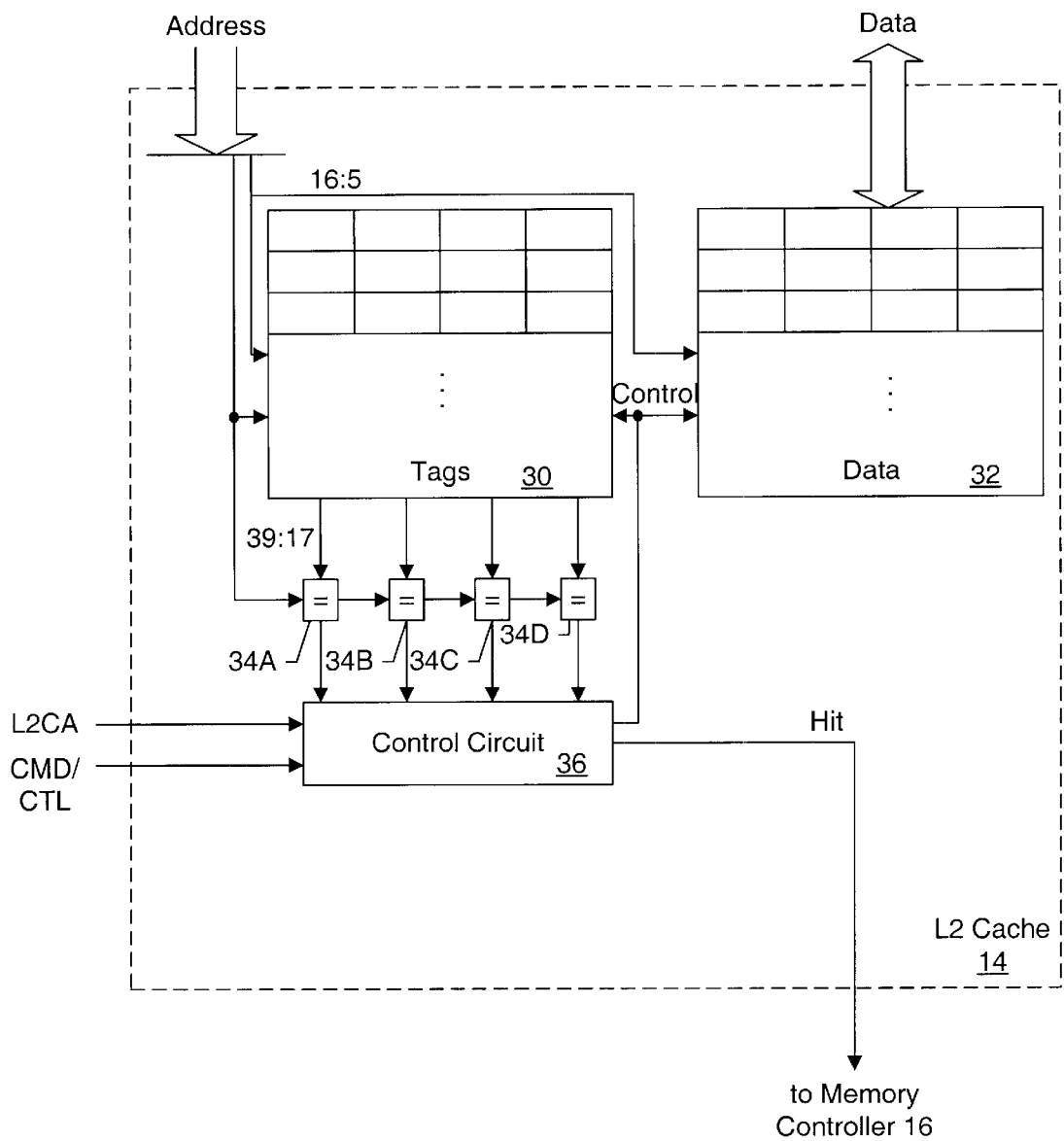
FIG. 3 is a block diagram of one embodiment of a cache shown in FIG. 1.

Turning now to FIG. 3, a block diagram of one embodiment of the L2 cache 14 is shown. Other embodiments are possible and contemplated. In the embodiment of FIG. 3, the L2 cache 14 includes a tags memory 30, a data memory 32, a set of comparators 34A–34C, and a control circuit 36. The tags memory 30 and the data memory 32 are each coupled to receive an index portion of an address of a transaction (the address of the transaction may be referred to more briefly herein as an "input address" to the L2 cache 14). The data memory 32 is coupled to receive and provide data corresponding to the transaction. The tags memory 30 is further coupled to receive a tag portion of the input address, and is coupled to the comparators 34A–34D. The comparators 34A–34D are further coupled to receive the tag portion of the input address and are coupled to the control circuit 36. The control circuit 36 is coupled to receive command/control information corresponding to the transaction (e.g. the command/control information described above with respect to FIG. 2) as well as the L2CA signal, and is further coupled to provide a hit signal output from the L2 cache 14 (e.g. to the memory controller 16, in the illustrated embodiment). The control circuit 36 is further coupled to provide a way selection and control signals to tags memory 30 and data memory 32.

Generally, the tags memory 30 stores the tag information for each cache block storage location in the L2 cache 14, and the data memory 32 stores the cache block of data for each cache block storage location in L2 cache 14. Thus, a cache block storage location of the L2 cache 14 comprises a tag memory storage location and a data memory storage location. The tag memory storage location stores the tag for the entry (and possibly other information, such as validity and dirty information). For example, in one implementation, a tag memory storage location stores the tag portion of the address (e.g. bits 39:17 in the illustrated embodiment), a valid bit indicating the validity or lack of validity of the entry, and a dirty bit indicating the dirty or clean state of the cache block. A cache block is dirty if at least one byte of the cache block has been modified and the modification has not been written to memory. The data memory storage location stores the cache block.

During a transaction, the index portion of the input address (e.g. bits 16:5 in the illustrated embodiment) is provided to the tags memory 30 and the data memory 32. Each memory selects a set of storage locations in response to the index. The tags memory 30 outputs the tag from each selected storage location to the comparators 34A–34D, which compare the tags to the tag portion of the input address. If the tag compares equally, the corresponding comparator 34A–34D may signal a hit to the control circuit 36. The control circuit 36 may assert the hit signal to the memory controller 16 if any of the comparators 34A–34D indicates a hit (and the corresponding valid bit is set), and may determine a way selection from the output of the comparators 34A–34D as well. Each comparator 34A–34D is comparing the tag from a different way of the L2 cache 14, and thus the comparator output indicating a hit is an indication of the hitting way. The control circuit 36 provides the way selection to the tags memory 30 and the data memory 32. As mentioned above, a hit is not detected in the L2 cache 14 for non-cacheable transactions.

In the case of a miss for a cacheable transaction, the L2 cache 14 may allocate a cache block storage location to store the missing cache block. The L2 cache 14 may select one of the ways within the index using any replacement algorithm (e.g. random, least recently used, etc.). The cache block currently stored in the selected way (if any) is evicted, thus providing room to store the missing cache block. Particularly, the L2 cache 14 may allocate a cache block storage location if the L2CA signal is asserted, and may not allocate a cache block storage location if the L2CA signal is deasserted. The control circuit 36 provides the replacement way selection to the tags memory 30 and the data memory 32 during the read used to evict the cache line.

The data memory 32 provides data from the storage location at the selected index and way, or receives data into that storage location, depending upon whether the transaction is a read or write. The control circuit 36 receives the control information corresponding to the transaction, and generates control signals for the data memory 32 and the tags memory 30. The control signals may include, for example, an enable signal and a read/write signal to indicate whether the memory is to read or write (and the aforementioned way selection).

The tags memory 30 may be updated in response to the transaction as well. For example, if the transaction is a write, the dirty bit in the hitting entry may be updated. Additionally, if the transaction is a miss in L2 cache 14 and is cacheable, the tags memory 30 may be updated to invalidate the evicted cache line indicated by the replacement way, as mentioned above. It is noted that tag updates and evictions may not occur in the same clock cycle that the L2 cache 14 is accessed to determine the hit/miss of the input address, in some embodiments.

It is noted that, while the cache shown in FIG. 3 is described as an embodiment of the L2 cache 14, the cache may be used as any cache (e.g. as an L1 cache in the processors 12A or 12B, an L3 cache, etc.). Generally, the cache of FIG. 3 may respond to a cache access including the input address (e.g. a transaction in the case of the L2 cache 14, or an access by the processor in the case of an L1 cache, etc.).

It is noted that the embodiment illustrated in FIG. 3 shows various exemplary address bit ranges for a particular implementation of the L2 cache (e.g. 4 way set associative, 512 kilobytes, with 32 byte cache blocks) and the size of the addresses provided on the bus 24. Other embodiments may vary any of these features and the bit ranges may be updated accordingly. For example, if the size of the cache is increased and the number of ways remains the same, the index bit range may be expanded (and the tag range reduced). The size of the address (40 bits in the illustrated embodiment) may be varied, affecting the bit ranges appropriately as well. Furthermore, the bit ranges may be selected differently in different implementations, according to design choice.

It is noted that, while the tags memory 30 and the data memory 32 are illustrated separately in FIG. 3, these memories may be integrated if desired. Generally, the tags memory 30 and the data memory 32 may form a memory for storing tags and corresponding cache blocks, whether the memory is divided into portions as illustrated or is a single integrated memory.

It is noted that FIG. 3 illustrates address, data, and control signals being supplied to the L2 cache circuitry. The L2 cache 14 may include buffers or queues (not shown) to capture address and data portions of transactions from the bus 24. The supplied address, data, and control signals may correspond to the transaction at the head of the buffers or queues.

Figure 4:
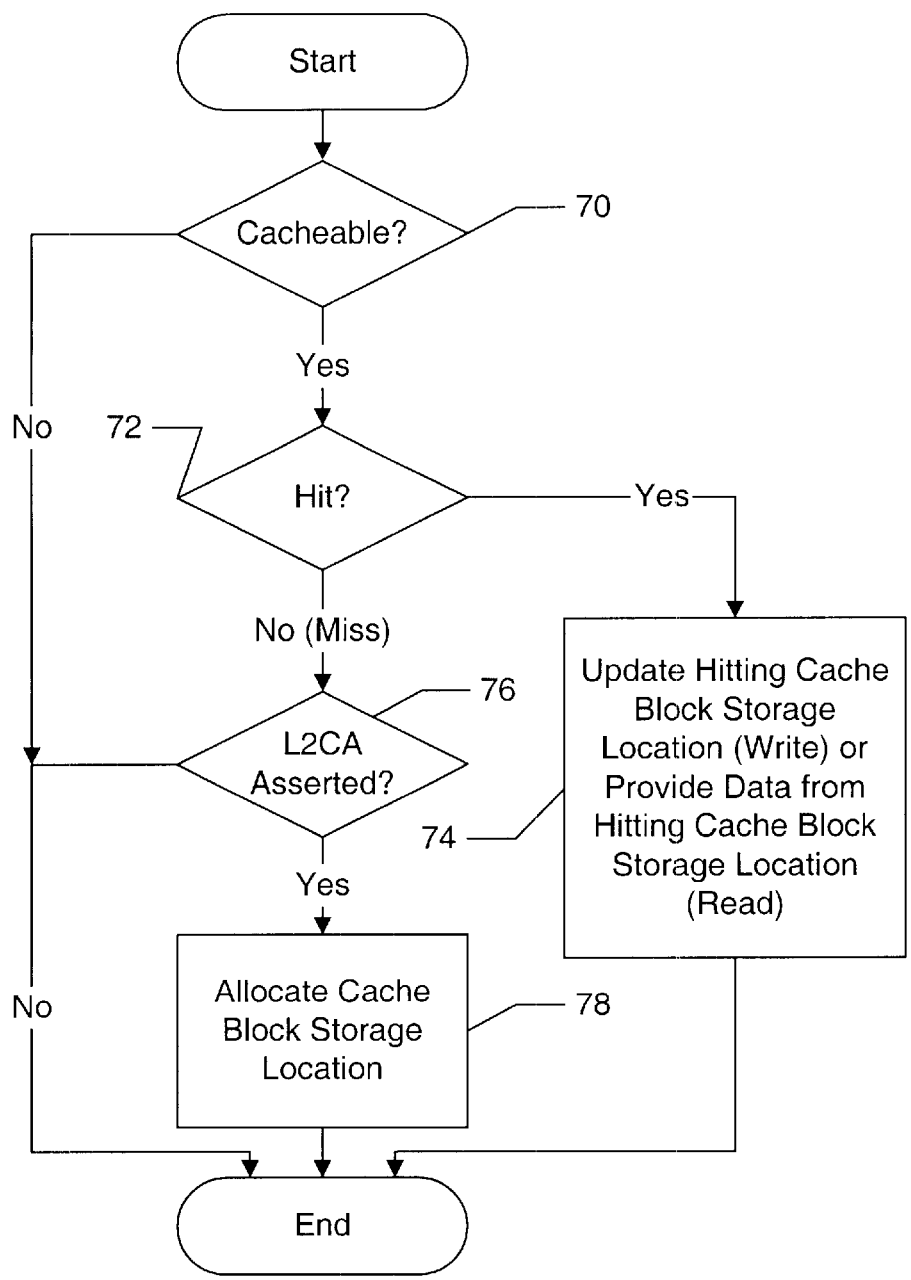
FIG. 4 is a flowchart illustrating operation of one embodiment of the cache shown in FIG. 3 in response to a cache allocate signal.

Turning next to FIG. 4, a flowchart illustrating operation of one embodiment of the L2 cache 14 in response to a transaction is shown. Other embodiments are possible and contemplated. Although the blocks shown in FIG. 4 are illustrated in a particular order for ease of understanding, any order may be used. Furthermore, blocks may be performed in parallel by combinatorial logic circuitry within the L2 cache 14. Blocks may be performed at different times then other blocks (e.g. in different clock cycles).

If the transaction is not cacheable (decision block 70, "no" leg), then the L2 cache 14 may take no additional action with respect to the transaction. The L2 cache 14 may not access the tag memory 30 or the data memory 32, or may access the memories but not alter the contents or supply any information therein in response to the transaction.

If the transaction is cacheable (decision block 70, "yes" leg) and is a hit in the L2cache 14 (decision block 72, "yes" leg), the L2 cache 14 may respond to the transaction (block 74). Particularly, if the transaction is a write, the L2 cache 14 may update the hitting cache block storage location with the write data provided in the transaction. This action may be delayed, since the write data is not provided until a later time. If the transaction is a read, the L2 cache 14 may supply the data from the hitting cache block storage location. Again, the supplying of the data on the bus 24 may be delayed until the data phase of the transaction occurs. The data may be read from the data memory 32 at the time of the access to the L2 cache 14, or later, as desired.

If the transaction is cacheable (decision block 70, "yes" leg), is a miss in the L2cache 14 (decision block 72, "no" leg) and the L2CA signal is not asserted (decision block 76, "no" leg), the L2 cache 14 may take no further action with respect to the transaction. Specifically, the L2 cache 14 may not allocate a cache block storage location to store the missing cache block.

On the other hand, if the transaction is cacheable (decision block 70, "yes" leg), is a miss in the L2 cache 14 (decision block 72, "no" leg) and the L2CA signal is asserted (decision block 76, "yes" leg), the L2 cache 14 may allocate a cache block storage location to store the cache block addressed by the transaction (block 78). The cache block stored in the allocated cache block storage location is evicted, and may be written to the memory 26 if dirty.

Figure 5:
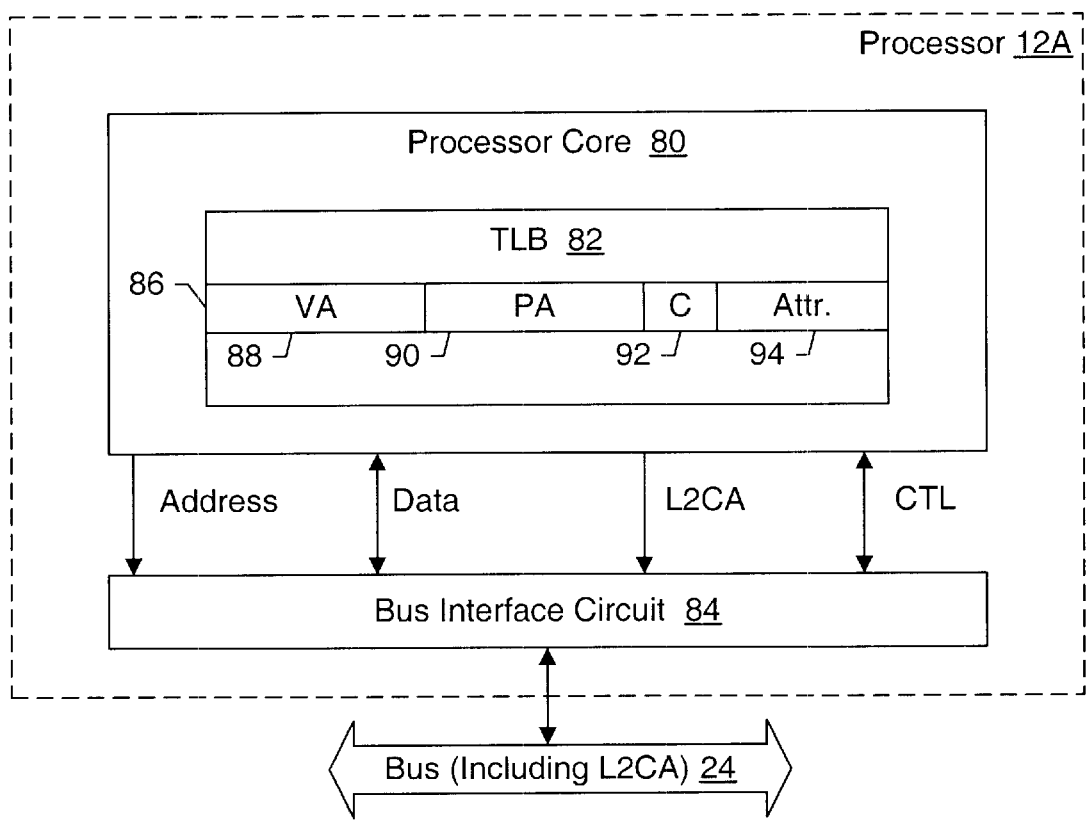
FIG. 5 is a block diagram of one embodiment of a processor shown in FIG. 1.

Turning next to FIG. 5, a block diagram of one embodiment of the processor 12A is shown. The processor 12B may be similar. Other embodiments are possible and contemplated. In the embodiment of FIG. 5, the processor 12A includes a processor core 80 (which includes a translation lookaside buffer (TLB) 82) and a bus interface circuit 84. The processor core is coupled to the bus interface circuit 84, which is further coupled to the bus 24 (which includes the L2CA signal as illustrated above).

The processor core 80 comprises the circuitry for executing the instructions defined in the instruction set architecture implemented by the processor 12A. The processor core 80 may include instruction and data caches, may be superscalar or scalar, pipelined, etc. The processor core 80 may employ virtual to physical address translation, and thus may employ the TLB 82 to cache virtual address tags and corresponding physical addresses. The processor core 80 may include separate instruction and data TLBs, or a combined TLB, as desired.

Generally, the processor core 80 may generate requests for transactions on the bus 24. The requests may be instruction fetches to read instructions for execution. Additionally, requests may be for data reads to read data operands for the instructions, or data writes to write instruction results to destination locations external to the processor 12A (e.g. memory locations, configuration registers, etc.). Additional sources of transaction requests may be included, as desired.

The bus interface circuit 84 includes circuitry for performing transactions on the bus 24, and may include circuitry from maintaining coherency with respect to transactions initiated by other agents on the bus 24. The bus interface circuit 84 may include one or more queues for queuing transaction requests from the processor core 80 until the transactions can be performed on the bus 24.

The processor core 80 transmits a request for a transaction to the bus interface unit 84. Generally, the request includes the address to be accessed in the transaction, the cache allocate indication for the transaction (L2CA between the processor core 80 and the bus interface circuit 84), and other control information. The other control information may include, for example, other attributes of the transaction (e.g. its cacheability, size if non-cacheable, whether the transaction is a read or a write, the MESI state desired, etc.). If the transaction request is a write, the processor core 80 may supply the data to be transmitted to the bus interface circuit 84. If the transaction is a read, the bus interface circuit 84 may supply the data returned on the bus 24 in response to the transaction to the processor core 80. The bus interface circuit 84 may also supply control information indicating that the data is being provided for the read.

The bus interface circuit 84 arbitrates for the bus 24 to perform the requested transaction, and transmits the transaction on the bus 24 in response to winning the arbitration. The bus interface circuit 84 either asserts or deasserts the L2CA signal during the address phase of the transaction based on the L2CA indication provided by the processor core 80.

The processor core 80 may generate the cache allocate indication for the transaction request in any desired fashion. In one embodiment, the processor core 80 may request L2 cache allocation if the transaction request is a prefetch. The prefetch may be generated in response to an explicit prefetch type instruction, or may be generated in hardware based on predictions of the next instructions/data to be fetched. In one implementation, the processor core 80 may not cache the prefetched data, and thus may request L2 cache allocation to cause the prefetched data to be placed in the L2 cache 14. In this manner, if the prefetched data is later fetched, the fetch may experience an L2cache hit latency rather than a memory latency.

In another implementation, the processor core 80 may cache prefetched data. In such an implementation, the processor core 80 may not request L2 cache and thus the L2cache 14 may not allocate storage for the prefetched data. If prefetched data is being prefetched to be used for a short period of time and then not used afterward, storing the data in the L1 cache but not the L2 cache may avoid storing data in the L2 cache that is not to be reused, while storing the data in the L1 cache (where it is likely not to be evicted during the short period of time that the data is being used).

Additionally, for fetch requests (either instruction fetch or data fetch), the processor core 80 may generate the cache allocate indication responsive to a cache indication field in the TLB entry corresponding to the address of the request. An exemplary TLB entry 86 is shown in FIG. 5. Generally, the TLB entry 86 includes a virtual address field 88 storing at least a portion of the virtual address (e.g. the page portion of the virtual address), a physical address field 90 storing at least a portion of the physical address (e.g. the page portion) corresponding to the virtual address, a cache indication field 92 storing a cache indication corresponding to the physical page, and an other attributes field 94 storing the other translation attributes for the page (e.g. privilege level information, read/write enable information, etc.). The exact format of the TLB entry 86 is implementation dependent and the information included therein depends on the instruction set architecture.

The cache indication may specify the caching policy for the page. The cache indication may specify at least cacheable and non-cacheable, and may specify additional cache policy, as desired (e.g. coherency attributes, such as whether or not the page is coherent, whether or not to request exclusive access when reading data in the page, allocation policies in the L1 cache for write miss, etc.). Additionally, the cache indication may specify whether or not to request L2 cache allocation. The L2 cache allocation may be independent of the L1 cache attributes (except that L2 cache allocation may not be requested if the page is noncacheable in the L1 cache). The processor core 80 may generate the L2 cache allocate indication responsive to the cache indication from the TLB entry corresponding to the request address.

In this manner, software may specify L2 cache allocation of pages used by the processor 12A through the page mapping mechanism. Thus, if certain pages store data which is infrequently reused, the translations for such pages may be coded with a cache indication specifying no L2 cache allocate. The translations for other pages may be coded with a cache indication specifying L2 cache allocate.

Figure 11:
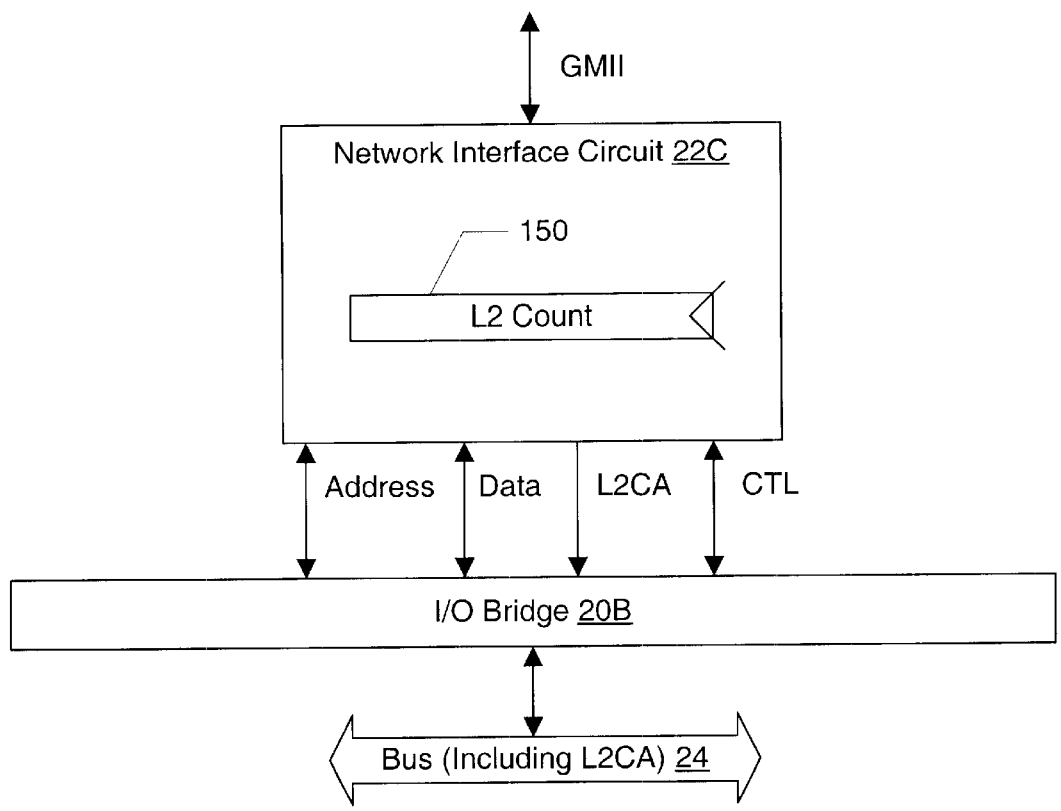
FIG. 11 is a block diagram illustrating certain details of one embodiment of an I/O bridge and a network interface.

It is noted that the interface between the processor core 80 and the bus interface circuit 84 illustrated in FIG. 5 is merely illustrative. The interface may be implemented in any desired fashion. Furthermore, while similar illustrative interfaces are shown in FIGS. 7 and 11, different interfaces may be used in each case as desired.

Figure 6:
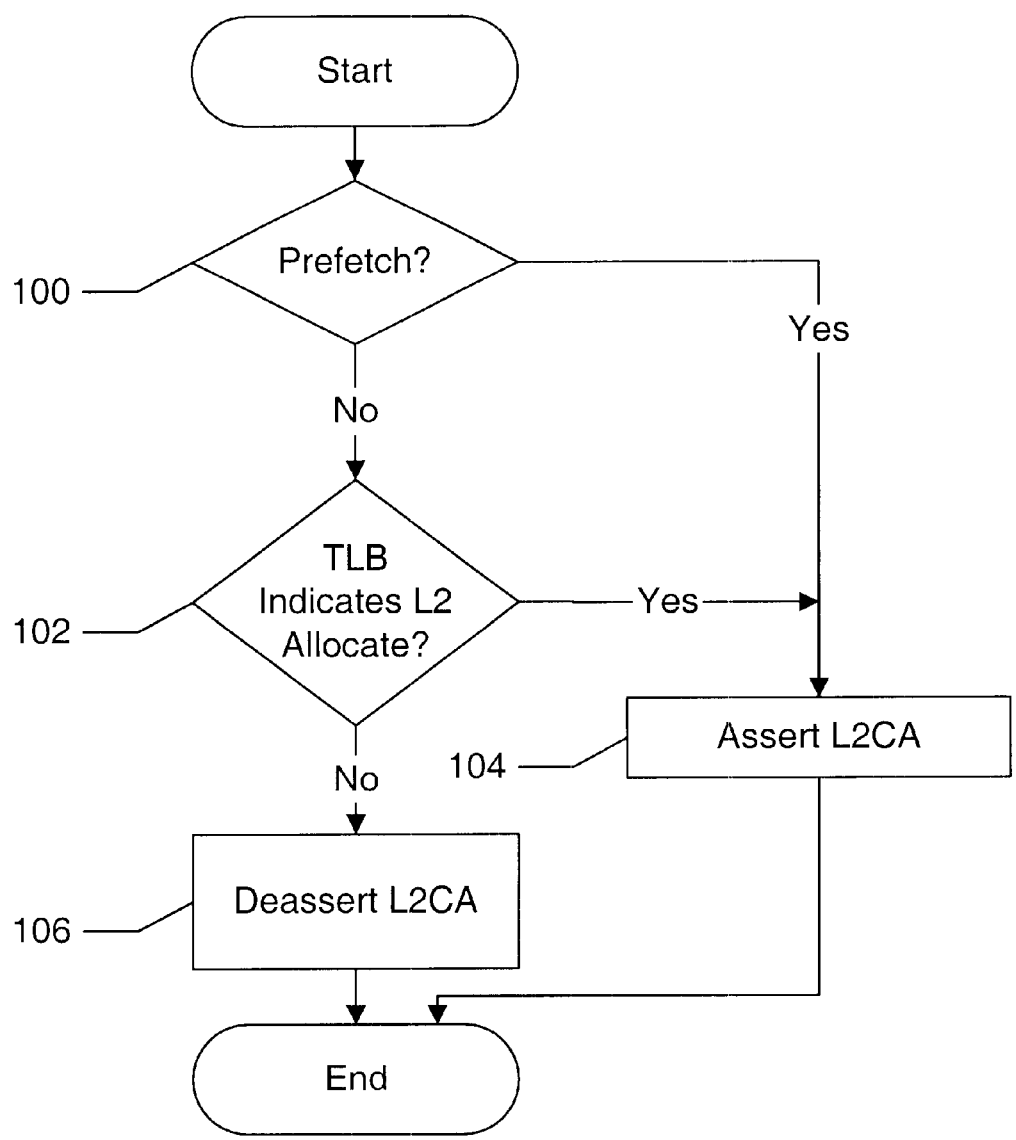
FIG. 6 is a flowchart illustrating use of the cache allocate signal by one embodiment of a processor.

Turning now to FIG. 6, a flowchart is shown illustrating operation of one embodiment of the processor 12A for generating the L2CA signal for a transaction being initiated by the processor 12A. The embodiment of FIG. 5 may be used, or any other embodiment, as desired. The processor 12B may operate similarly. Other embodiments are possible and contemplated. While the blocks shown are illustrated in a particular order for ease of understanding, any order may be used. Furthermore, blocks may be performed in parallel by combinatorial logic circuitry within the processor 12A.

If the transaction is generated in response to a prefetch (decision block 100, "yes" leg), the processor 12A asserts the L2CA signal during the transaction (block 104). If the TLB entry corresponding to the transaction (the TLB entry which maps the virtual address of the transaction to the physical address of the transaction) indicates L2 cache allocated (decision block 102, "yes" leg), the processor 12A asserts the L2CA signal during the transaction (block 104). Otherwise (decision blocks 100 and 102, "no" legs), the processor 12A deasserts the L2CA signal (block 106).

Figure 7:
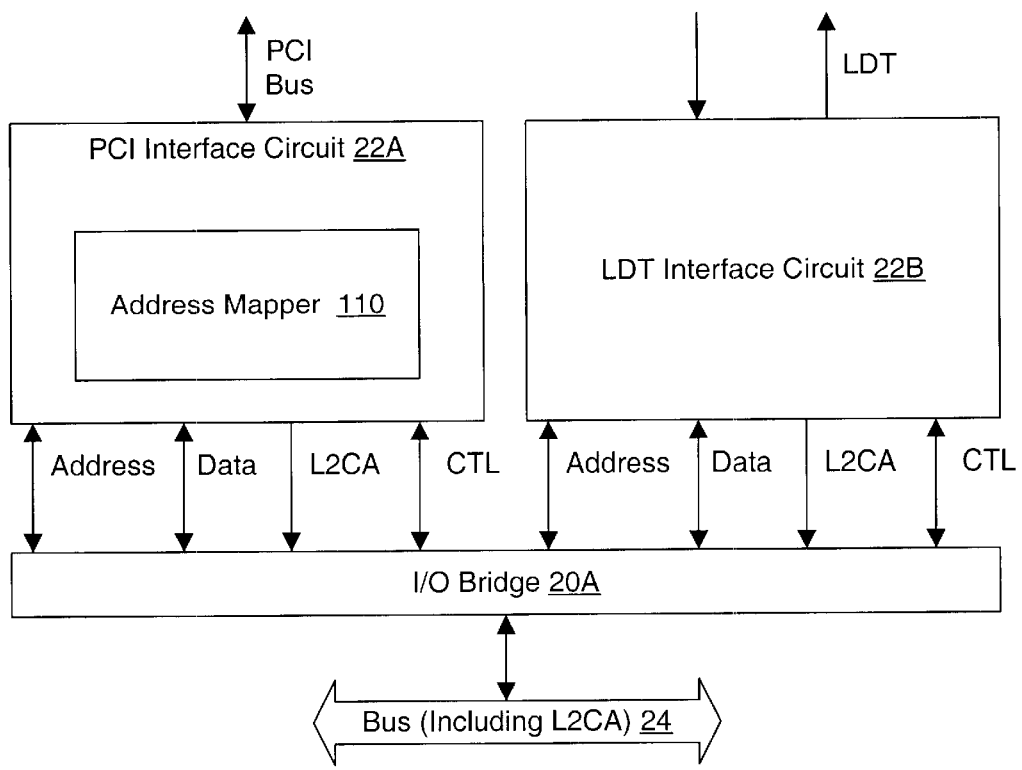
FIG. 7 is a block diagram illustrating certain details of one embodiment of an I/O bridge, PCI interface, and LDT interface shown in FIG. 1.

Turning now to FIG. 7, a block diagram illustrating one embodiment of the PCI interface circuit 22A, the LDT interface circuit 22B, and the I/O bridge 20A is shown. Other embodiments are possible and contemplated. In the illustrated embodiment, the PCI interface circuit 22A includes an address mapper 110. The PCI interface circuit 22A and the LDT interface circuit 22B are coupled to the I/O bridge 20A, which is further coupled to the bus 24.

The PCI interface circuit 22A and the LDT interface circuit 22B may generate requests for transactions on the bus 24 and transmit the requests to the I/O bridge 20A, similar to the fashion in which the processor core 80 transmits requests to the bus interface circuit 84 in FIG. 5. Generally, the PCI interface circuit 22A may generate transaction requests in response to transactions received on the PCI bus which are targeted at an agent on the bus 24 (e.g. the memory controller 16/L2 cache 14). Similarly, the LDT interface circuit 22B may generate transaction requests in response to packets received on the LDT fabric. Additionally, the I/O bridge 20A may route transactions from the bus 24 to the PCI interface circuit 22A and the LDT interface circuit 22B if those transactions are targeted at that interface circuit or devices coupled to the PCI bus or LDT fabric. In one embodiment, portions of the address space addressable by addresses on bus 24 are mapped to the PCI interface circuit 22A, the LDT interface circuit 22B, the PCI bus, and the LDT fabric.

Each of the transaction requests from the PCI interface circuit 22A and the LDT interface circuit 22B includes a cache allocate indication (L2CA between the circuits 22A–22B and the I/O bridge 20A in FIG. 7). The interface circuits may use a variety of mechanisms to determine whether to request L2 cache allocation or not to request L2cache allocation for cache misses.

Figure 9:
FIG. 9 is a block diagram of one embodiment of an LDT packet.
Figure 9:

For example, the LDT interface circuit 22B may use an isochronous indication in the LDT read and write packets to determine the L2CA indication for the transaction. An exemplary packet is shown in FIG. 9 below. Specifically, if the isochronous indication indicates that the data read/written in the transaction is isochronous data, the LDT interface circuit 22B may assert the L2CA indication to request L2 cache allocation. If the data is not isochronous, the LDT interface circuit 22B may not assert the L2CA indication.

Isochronous data may generally be time sensitive, in that the time elapsing while processing the data may be important to the overall operation represented by the data. If too much time elapses, the quality or correctness of the overall operation may be compromised. By causing allocation in the L2 cache 14 for such data, the latency of subsequent accesses to the data may be reduced, which may decrease the overall processing time for the isochronous data.

The PCI interface circuit 22A may use the address mapper 110 to determine the L2CA indication for transactions mapped by the address mapper. An exemplary address mapper 110 is shown in greater detail in FIG. 8 below. Generally, the address mapper 110 may map addresses received by the PCI interface circuit 22A to different addresses on the bus 24. Additionally, the map entries may store an L2CA indication corresponding to the mapped addresses. The PCI interface circuit 22A may assert the L2CA indication or not assert the L2CA indication based on the indication from the map entry corresponding to a given address. In one implementation, the address mapper 110 may map addresses only within a range of the PCI address space. For the remaining addresses, the PCI interface circuit 22A may not assert the L2CA indication (thus not requesting L2 cache allocation). Accordingly, software may control (through programming the address mapper 110) which addresses are allocated to the L2 cache 14 and which are not (on a granularity corresponding to the granularity of the address mapper 110).

It is noted that other interface circuits 22A and 22C–22I may be coupled to receive isochronous indications and may assert/deassert the L2CA indication in response thereto. While the isochronous indication is part of the packet on the LDT fabric, the isochronous indication may be provided in other ways on other interfaces. For example, the isochronous indication could be a control signal on a bus, or may be part of the command information indicating the type of command on the bus, etc.

It is further noted that other interface circuits 22B–22I may include address mappers similar to address mapper 110. The other interface circuits 22B–22I may be configured to generate L2CA indications responsive to the indication in the entry mapping the address of a transaction.

Generally, the I/O bridge 20A may include queues for queuing transaction requests from the I/O interface circuits 22A–22B until the transactions are performed on the bus 24. It is noted that transactions on the PCI bus and packets on the LDT bus may sometimes be other than a cache block in size. For write transactions which are not a cache block in size, the I/O bridge 20A may be configured to read the cache block, modify the cache block with the write data, and write the modified cache block back to memory/L2 cache. This action is referred to as read-modify-write.

Figure 8:
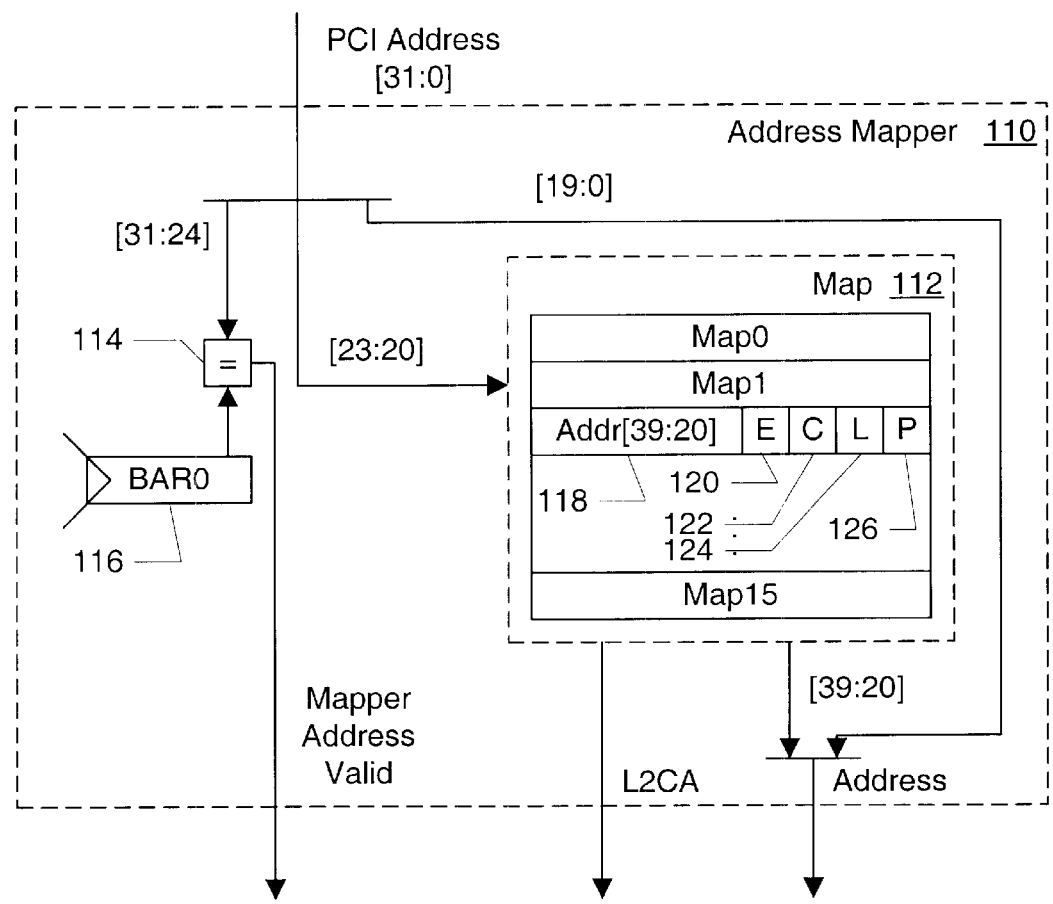
FIG. 8 is a block diagram of one embodiment of an address mapper shown in FIG. 7.

Turning now to FIG. 8, a block diagram of one embodiment of the address mapper 110 is shown. Other embodiments are possible and contemplated. In the embodiment of FIG. 8, the address mapper 110 includes a map 112 comprising a plurality of entries (Map0 through Map 15, for a total of 16 entries in the illustrated embodiment, although the number may be higher or lower in other embodiments). Map2 is shown in greater detail to highlight the information stored therein for one embodiment. The address mapper 110 further includes a comparator 114 and a configuration register 116. The address mapper 110 is coupled to receive a 32 bit PCI address and is coupled to provide a 40 bit address, an L2 cache allocate indication (L2CA) and a mapper address valid signal to other circuitry within the PCI interface circuit 22A (not shown). More particularly, the comparator 114 is coupled to receive a portion of the PCI address and is coupled to the configuration register 116. The map 112 is coupled to receive a portion of the PCI address as an index.

The address mapper 110 shown in FIG. 8 maps a portion of the PCI address space. Specifically, the configuration register 116 may be programmed with a set of most significant bits of the PCI address (e.g. bits 31:24 in this embodiment, although the number of bits may be varied), defining an address range within the PCI address space which is mapped by the address mapper 110. The next most significant bits exclusive of the bits programmed into the configuration register 116 (e.g. bits 23:20 in this embodiment) are used as an index into the map 112. The number of bits used in the index depends on the number of map entries in the map 112 (16 in this embodiment, and thus 4 bits are used as an index). If more map entries are used, more index bits may be used. If fewer map entries are used, fewer index bits may be used. The remaining bits (e.g. bits 19:0 in this embodiment) form the least significant bits of the address output by the address mapper 110. In other words, the least significant bits are concatenated with the address bits output by the map 112 to form the address output by the address mapper 110. Accordingly, in this embodiment, addresses are mapped on a 1 Megabyte (MB) granularity.

The address mapper 110 may be used, in the illustrated embodiment, to map a portion of the 32 bit PCI address space into 40 bit addresses outside of the lowest addressed 4 Gigabytes of the 40 bit address space. Thus, the address mapper 110 may allow for some PCI addresses to access addresses above those available with the 32 bits of address supplied on the PCI bus. The portion of the PCI address space to be mapped is specified in the configuration register 116 (labeled BAR0 in FIG. 8). The configuration register 116 may be mapped to the base address register 0 in the PCI-specified base address register access scheme (e.g. the configuration register 116 may be read/written by an access to the appropriate offset in the configuration header using PCI configuration space accesses). Specifically, in one implementation, the configuration register 116 may be accessible at offset 10 (hexadecimal) in a type 0 configuration header used by the PCI interface circuit 22A. The map entries of the map 112 may also be mapped to the configuration header to allow programming of the map entries by reads/writes to the configuration header space. For example, the map entries of the illustrated map 112 may be accessible at offsets 44 through 80 (hexadecimal) in the type 0 configuration header.

If the PCI address of a given PCI transaction matches (in bits 31:24) the address stored in the configuration register 116, the comparator 114 asserts its output signal (mapper address valid). The assertion of the mapper address valid signal informs the PCI interface circuit 22A that the address produced by the address mapper 110 is to be used as the address of the transaction on the bus 24 (replacing the PCI address). If the mapper address valid signal is deasserted, the PCI address may be used (prepended with zeros to fill the 40 bit address used on the bus 24). Other remappings may be supported as well (either programmable or fixed in hardware), in which case the PCI address may not be used if the other remappings are detected.

Generally, the index portion of the PCI address is used to select one of the map entries in the map 112. The selected map entry outputs its information for use in mapping the address. Specifically, map0 may be selected if the index is zero, map1 is selected if the index is 0001 (in binary), etc. Each map entry may include (as shown for entry map2 in FIG. 8), an address field 118 storing the portion of the address generated by map 112 (e.g. bits 39:20 in this embodiment), an enable bit 120, a cache bit 122, an LDT bit 124, and an endian policy field 126. The address field 118 of the indexed entry is output and concatenated with the least significant bits of the PCI address to form the output address of the address mapper 110. The enable bit 120 may be set to enable the entry and clear to disable the entry (or vice versa). If the entry is not enabled, the PCI interface circuit 22A may not accept the address from the PCI bus (e.g. the DEVSEL# signal on the PCI bus may not be asserted). The LDT bit 124 may be set to indicate that the address is to be sent in a transaction on the LDT fabric and clear to indicate that the address is to be sent in a transaction on the bus 24 (or vice versa). If the address is to be sent in a transaction on the LDT fabric, the bus bridge 20A may route the transaction to the LDT interface circuit 22B rather than perform a transaction on the bus 24. The endian policy field 126 may set the endian policy to be used (big endian, little endian with match byte lanes, little endian with match bit lines) for the transfer.

The cache bit 122 is used to generate the L2CA indication. For example, the cache bit 122 may be set to indicate that the L2 cache allocation is to be requested and clear to indicate that L2 cache allocation is not to be requested. Thus, the cache bit may be output as the L2CA indication. Other embodiments may reverse the encodings of the cache bit 122 or use other encodings, as desired.

Turning next to FIG. 9, a block diagram of one embodiment of an LDT command packet 130 is shown. Other embodiments are possible and contemplated. The packet 130 is illustrated as a set of bit times (1 through 8). A bit time is a transfer on the LDT fabric. The LDT fabric is a set of point to point links which may be 8, 16, or 32 bits wide. A source synchronous clock may be transmitted by the transmitter on a given link, and data may be transferred on both edges of the clock. Thus, 2 bit times per clock cycle may occur. The bit times illustrated in FIG. 9 are for an eight bit link (and thus bits 7:0 are listed at the top of the packet illustration). The bit times for a 16 bit link may be formed by concatenating sets of two consecutive bit times (e.g. bit time 1 and bit time 2 as shown in FIG. 9 may be concatenated to form bit time 1 of the 16 bit link; bit time 3 and bit time 4 as shown in FIG. 9 may be concatenated to form bit time 2 of the 16 bit link; etc.). Similarly, the bit times for a 32 bit link may be formed by concatenating sets of four consecutive bit times (e.g. bit times 1, 2, 3 and 4 as shown in FIG. 9 may be concatenated to form bit time 1 of the 32 bit link; bit times 5, 6, 7, and 8 as shown in FIG. 9 may be concatenated to form bit time 2 of the 32 bit link; etc.).

Bit time 1 includes a command field (CMD[5:0]). Exemplary encodings of the command field are shown in a table 132 for writes and for reads. Other alternative encodings may be used, as desired. For a write, CMD bits 4 and 3 are constants (binary 0 and 1, respectively). CMD bit 5 is used to indicate whether or not the write is posted (e.g. set for posted writes and clear for non-posted writes, or vice versa). For a read, CMD bits 5 and 4 are constants (binary 0 and 1, respectively). CMD bit 3 is an indication of whether or not the read response to the read may pass a posted write in order. For example, if the bit is set, the read response may pass the posted write and, if the bit is clear, the read response may not pass the posted write (or vice versa for the bit encodings). CMD bits 2:0 are defined the same for reads and writes in this embodiment. CMD bit 2 may be the length of data items (e.g. byte or doubleword, which may be 4 bytes in this embodiment). CMD bit 1 may be the isochronous indication. For example, the isochronous bit may be set to indicate isochronous and clear to indicate non-isochronous (or vice versa). Finally, CMD bit 0 indicates whether or not probes are required for this read/write (i.e. whether or not this read/write is coherent).

Accordingly, for the illustrated embodiment, the isochronous indication is part of the command field. However, other embodiments may locate the isochronous indication outside of the command field, anywhere within the packet.

The other fields illustrated in packet 130 are defined in the LDT specification, and are briefly described here. For writes, the command packet 130 may be followed by a data packet with the write data. For reads, the LDT interface circuit 22B may generate a read response packet for transmission on the LDT fabric when the read data is received.

The sequence identifier (SeqId[3:0]) may be used to tag multiple packets which are to be ordered with respect to each other. Each such packet may be assigned the same sequence identifier. The unit identifier (UnitID[4:0]) identifies the source of the read/write command on the LDT fabric. The PassPW bit may indicate whether or not the read/write is allowed to pass a posted write in order. The source tag (SrcTag[4:0]) is a tag assigned by the source to identify the packet among others issued by the same source. The compat bit may be used to route transactions to a southbridge (to implement subtractive address decoding). The mask/count field (Mask/Count[3:0]) is used, for doubleword size reads/writes, to provide the doubleword count being transferred. For byte size reads, the mask/count field is a mask with each bit indicating which of the four bytes within a single doubleword is being read. For byte writes, the data packet includes the mask and thus the mask/count field encodes the total number of doublewords in the data packet (including the mask). The address field (Addr[39:2]) carries the address of the transaction in the packet 130.

Figure 10:
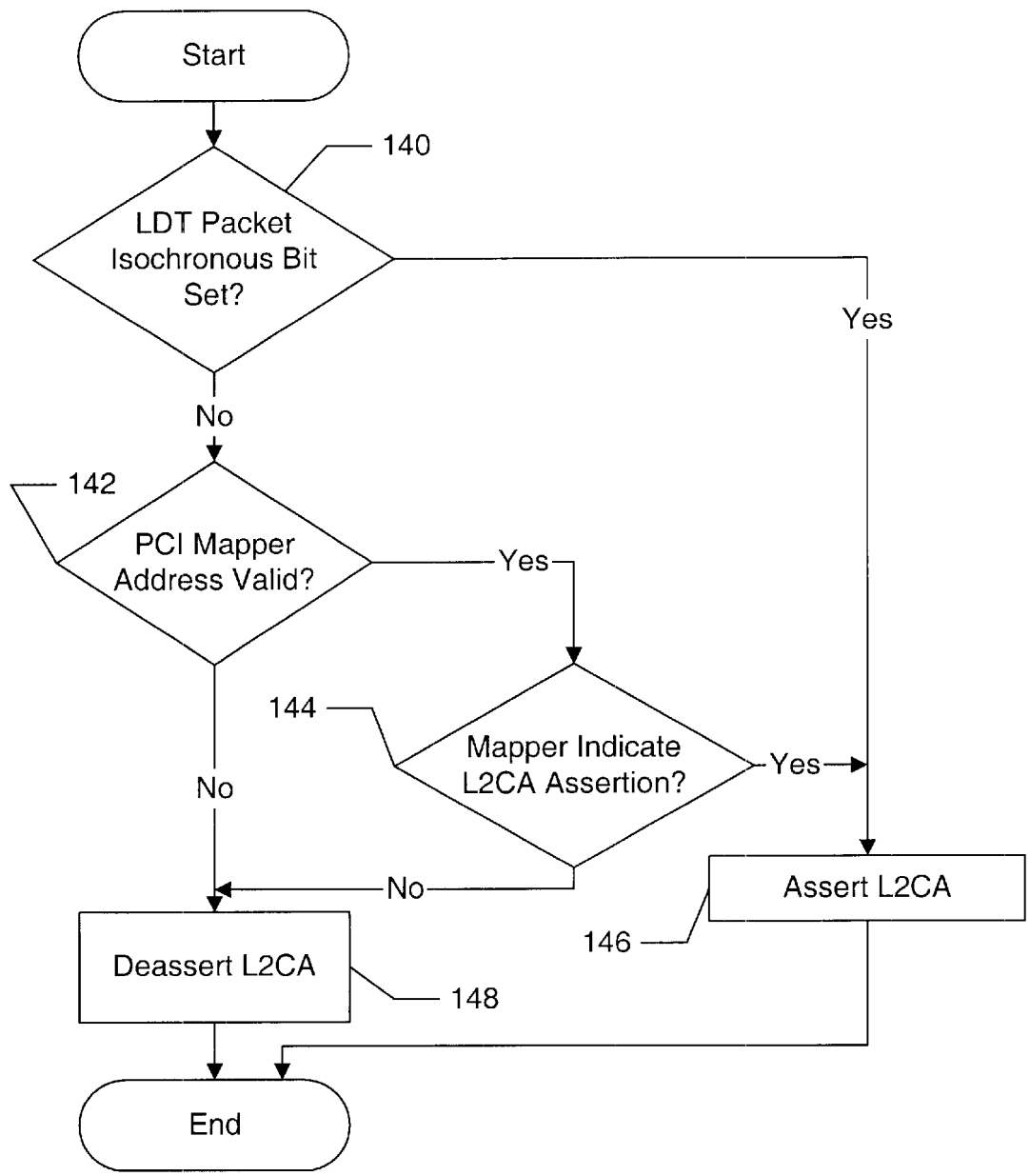
FIG. 10 is a flowchart illustrating use of the cache allocate signal by one embodiment of the PCI interface and the LDT interface.

Turning next to FIG. 10, a flowchart is shown illustrating operation of one embodiment of the combination of the PCI interface circuit 22A, the LDT interface circuit 22B, and the I/O bridge 20A for providing the L2CA signal for a transaction on the bus 24 initiated by the I/O bridge 20A. Other embodiments are possible and contemplated. While the blocks shown are illustrated in a particular order for ease of understanding, any order may be used. Specifically, block 140 and blocks 142–144 are independent and may be performed in either order or in parallel. Furthermore, blocks may be performed in parallel by combinatorial logic circuitry within the I/O bridge 20A, the PCI interface circuit 22A, and/or the LDT interface circuit 22B.

If the transaction is performed in response to an LDT packet, and the LDT packet has the isochronous bit set (decision block 140, "yes" leg), the I/O bridge 20A asserts the L2CA signal (block 146). If the transaction is performed in response to a PCI transaction, the PCI mapper address is valid (decision block 142, "yes" leg), and the mapper indicates L2CA assertion (decision block 144, "yes" leg), the I/O bridge 20A asserts the L2CA signal (block 146). If the transaction is performed in response to an LDT packet which has a clear isochronous bit (decision block 140, "no" leg), or a PCI transaction for which the address mapper does not map the address (decision block 142, "no" leg), or the address mapper does map the address but does not indicate L2CA assertion (decision block 144, "no" leg), the I/O bridge 20A deasserts the L2CA signal (block 148).

Turning next to FIG. 11, a block diagram of one embodiment of the network interface circuit 22C is shown. Other network interface circuits 22D–22E may be configured similarly. Other embodiments are possible and contemplated. In the embodiment of FIG. 11, the network interface circuit 22C includes an L2 count register 150. The network interface circuit 22C is coupled to the I/O bridge 20B, which is further coupled to the bus 24.

The network interface circuit 22C may generate requests for transactions on the bus 24 and transmit the requests to the I/O bridge 20B, similar to the fashion in which the processor core 80 transmits requests to the bus interface circuit 84 in FIG. 5. Generally, the network interface circuit 22C may generate transaction requests in response to receiving packets on the network interface to which it is coupled (e.g. the GMII interface for embodiments implementing an Ethernet MAC within the network interface circuit 22C, or a generic packet interface, or any other type of network interface). The network interface 22C may transfer the received packets to the memory 26/L2 cache 14 for processing by the processors 12A–12B.

Specifically, the processors 12A–12B may frequently operate on the header portion of the packet, which is the first portion of the packet received from the network interface. More complex packet processing algorithms continue to be developed, in which a portion of the data payload of the packet is also processed. The software executing in the system 10 may generally be able to determine how much of the packet is to be processed and may program the L2 count register 150 with an indication of the number of bytes (or cache blocks) of the start of a packet which are to be stored in the L2cache 14. The number of bytes may include all of the portion of the packet to be processed by the processors 12A–12B. If different amounts of the packet are processed for different packets, the number of bytes may be the largest amount of the packet to be processed. Alternatively, the number of bytes may be the number of bytes which are frequently processed, if different amounts of processing occur for different packets. The network interface circuit 22C may use the value in the L2 count register 150 to generate the L2CA signal for the transactions used to transfer the packet to the memory 26/L2cache 14.

Each of the transaction requests from the network interface circuit 22C includes a cache allocate indication (L2CA between the network interface circuit 22C and the I/O bridge 20B in FIG. 11). The network interface circuit 22C generates the L2CA indication for each transaction based on its location within the packet and the L2 count. The I/O bridge 20B may queue the transaction request, arbitrate for the bus 24, and perform the transaction, asserting or deasserting the L2CA signal on the bus 24 according to the L2CA indication provided by the network interface circuit 22C.

It is noted that the network interface circuit 22C is supplied with a memory address to store received packets. In one embodiment, the network interface circuit 22C may include a DMA engine which may be provided one or more DMA descriptors which identify data buffers in memory into which the network interface circuit 22C is permitted to store packets. When a start of a packet is received and is ready for transfer to memory, the DMA engine may select the next descriptor and DMA the packet into the identified data buffer.

Figure 12:
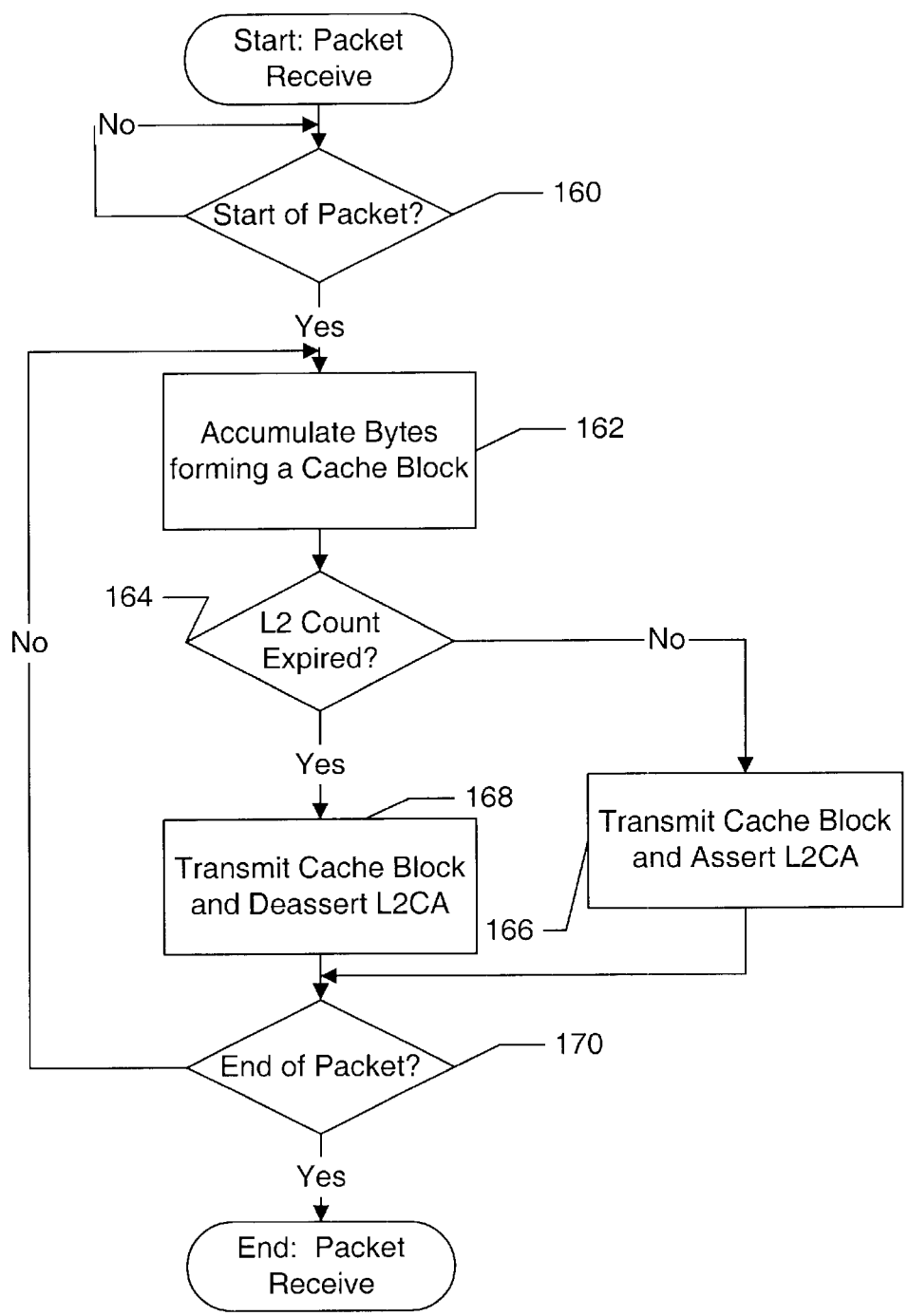
FIG. 12 is a flowchart illustrating operation of one embodiment of a network interface during packet reception.

Turning now to FIG. 12, a flowchart is shown illustrating operation of one embodiment of the network interface circuit 22C (and the I/O bridge 20B) for receiving a packet. Other embodiments are possible and contemplated. While the blocks shown are illustrated in a particular order for ease of understanding, any order may be used. Furthermore, blocks may be performed in parallel by combinatorial logic circuitry within the I/O bridge 20B and the network interface circuit 22C.

The network interface circuit 22C determines if the start of a packet is being received (decision block 160). Depending on the type of network interface, the start of the packet may be indicated in a variety of ways. For embodiments employing an Ethernet MAC, the start of the packet is indicated according to the GMII specification. For embodiments employing a generic packet interface, a control signal may indicate the start or end of a packet. Other network interfaces may specify the beginning of a packet in any suitable fashion.

If the beginning of a packet is being received, the network interface circuit 22C may accumulate packet bytes until at least a cache block has been assembled (block 162). If the number of cache blocks indicated by the L2 count register 150 have not been transferred for the packet yet (decision block 164, "no" leg), the network interface circuit 22C may transmit a write transaction request to the I/O bridge 20B with the L2CA indication asserted (block 166). The I/O bridge 20B may transmit the write transaction on the bus 24 with the L2CA signal asserted. On the other hand, if the number of already (decision block 164, "yes" leg), the network interface circuit 22C may transmit a write transaction request to the I/O bridge 20B with the L2CA indication deasserted (block 168). The I/O bridge 20B may transmit the write transaction on the bus 24 with the L2CA signal deasserted. The network interface circuit 22C may count the transactions sent in any suitable fashion. For example, the network interface circuit 22C may initialize a counter to zero at the start of a packet and increment the counter for each transaction request sent. If the counter equals or exceeds the number of cache blocks indicated by the L2 count, then the L2 count has expired. Alternatively, the network interface circuit 22C may initialize a counter at the number of cache blocks indicated by the L2 count, and decrement the count for each transaction request sent. When the counter reaches zero, the L2 count has expired.

If the network interface circuit 22C has not yet received the end of the packet (decision block 170, "no" leg), the network interface circuit 22C may continue accumulating packet bytes. It is noted that the receiving of packet bytes from the interface and the transmission of cache blocks to memory may generally be independent activities proceeding in parallel. The network interface circuit 22C may include a FIFO or other buffer for the receiving circuitry (e.g. the MAC) to store the data into and the DMA engine (or other transmission circuitry) to read the data out for transmission.

Figure 13:
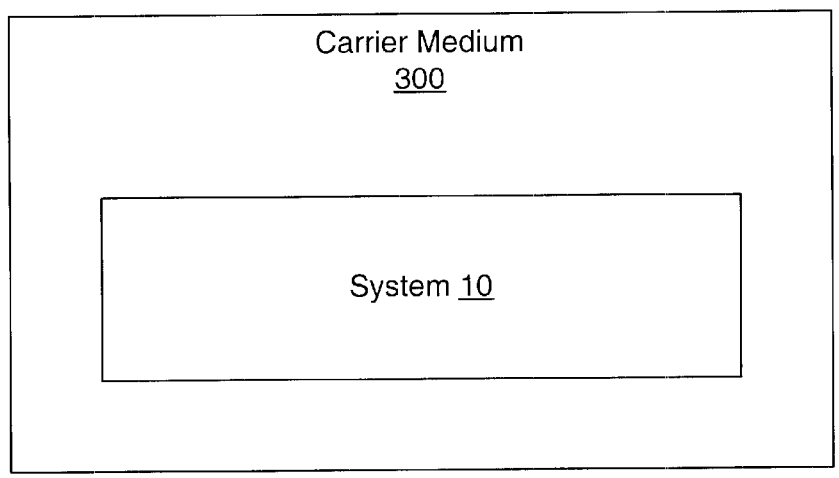
FIG. 13 is a block diagram of one embodiment of a carrier medium.

Turning next to FIG. 13, a block diagram of a carrier medium 300 including a database representative of the system 10 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Generally, the database of the system 10 carried on the carrier medium 300 may be a database which can be read by a program and used, directly or indirectly, to fabricate the hardware comprising the system 10. For example, the database may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the system 10. The netlist may then be placed and routed to produce a data set describing geometric shapes to be applied to masks. The masks may then be used in various semiconductor fabrication steps to produce a semiconductor circuit or circuits corresponding to the system 10. Alternatively, the database on the carrier medium 300 may be the netlist (with or without the synthesis library) or the data set, as desired.

While the carrier medium 300 carries a representation of the system 10, other embodiments may carry a representation of any portion of the system 10, as desired, including any set of agents (e.g. the processors 12A–12B, the L2 cache 14, the memory controller 16, and/or the I/O bridges 20A–20B), I/O interface circuits 22A–22I, or portions thereof, the bus 24, etc.

Numerous variations and modifications will become apparent to those skilled in the art once the above disclosure is fully appreciated. It is intended that the following claims be interpreted to embrace all such variations and modifications.

What is claimed is:

1. A system comprising:
    an agent configured to initiate a cacheable transaction addressing a first cache block;
    a cache coupled to receive the transaction, the cache including a plurality of cache block storage locations for storing cache blocks;
    wherein the agent is configured to transmit a cache allocate indication in an initial transmission of the transaction, wherein the cache allocate indication indicates whether or not the cache is to allocate one of the plurality of cache block storage locations to store the first cache block if the transaction is a miss in the cache; and
    wherein the cache, if the transaction is a miss, is configured to selectively allocate one of the plurality of cache block storage locations to store the first cache block responsive to the cache allocate indication.

2. The system as recited in claim 1 wherein the cache, if the transaction is a hit in a first cache block storage location of the plurality of cache block storage locations, is configured to receive the first cache block into the first cache block storage location or provide the first cache block from the first cache block storage location in response to the transaction independent of the cache allocate indication.

3. The system as recited in claim 1 wherein the agent and the cache are coupled to an interconnect, and wherein the agent is configured to initiate the transaction on the interconnect, and wherein the cache is configured to receive the transaction from the interconnect.

4. The system as recited in claim 3 wherein the transaction includes at least an address phase and a data phase on the interconnect, and wherein the agent is configured to transmit the cache allocate indication during the address phase.

5. The system as recited in claim 1 wherein the agent comprises a processor, and wherein the transaction is a prefetch, and wherein the processor transmits the cache allocate indication in a state indicating that the cache is to allocate one of the plurality of cache block storage locations to store the first cache block.

6. The system as recited in claim 1 wherein the agent comprises a processor, and wherein the transaction is a prefetch, and wherein the processor transmits the cache allocate indication in a state indicating that the cache is not to allocate one of the plurality of cache block storage locations to store the first cache block.

7. The system as recited in claim 1 wherein the agent comprises a processor including a translation lookaside buffer (TLB), and wherein the TLB is configured to store a cache attribute corresponding to a page including the first cache block, and wherein the processor is configured to generate the cache allocate indication responsive to the cache attribute.

8. The system as recited in claim 1 wherein the agent is configured to perform the transaction in response to a second transaction on an input/output interface, and wherein the second transaction includes an isochronous indication, and wherein the agent is configured to generate the cache allocate indication responsive to the isochronous indication.

9. The system as recited in claim 1 further comprising an address mapper configured to map a first address received on an input/output interface to a second address of the first cache block, and wherein the address mapper is configured to generate the cache allocate indication.

10. The system as recited in claim 9 wherein the address mapper is configured to map a portion of an address space including the first address, and wherein the agent is configured to transmit the cache allocate indication in a state indicating that the cache is not to allocate one of the plurality of cache block storage locations responsive to the first address being outside the portion.

11. The system as recited in claim 1 wherein the agent is configured to initiate a plurality of transactions including the transaction in response to receiving a packet on a network interface, and wherein the agent is configured to transmit an initial number of the plurality of transactions with the cache allocate indication in a first state indicating that the cache is to allocate one of the cache block storage locations, and wherein the agent is configured to transmit the cache allocate indication for the transaction in the first state if the transaction is one of the initial number of the plurality of transactions.

12. The system as recited in claim 11 wherein the agent is configured to transmit a remaining number of the plurality of transactions with the cache allocate indication in a second state indicating that the cache is not to allocate one of the cache block storage locations, and wherein the agent is configured to transmit the cache allocate indication for the transaction in the second state if the transaction is one of the remaining number of transactions.

13. An apparatus comprising:
a first circuit configured to generate a request for a cacheable transaction addressing a first cache block on an interconnect, the first circuit further configured to determine whether or not a cache on the interconnect is to allocate a cache block storage location to store the first cache block if the first cache block is a miss in the cache; and
a second circuit configured to transmit the transaction on the interconnect, the transaction including a cache allocate indication in an initial transmission of the transaction indicating whether or not a cache on the interconnect is to allocate a cache block storage location to store the first cache block if the first cache block is a miss in the cache.

14. The apparatus as recited in claim 13 wherein, if the transaction is a prefetch, the first circuit is configured to determine that the cache is to allocate the cache block storage location.

15. The apparatus as recited in claim 13 wherein the first circuit includes a translation lookaside buffer (TLB), wherein the TLB is configured to store a cache attribute corresponding to a page including the first cache block, and wherein the first circuit is configured to determine the cache allocate indication responsive to the cache attribute.

16. The apparatus as recited in claim 13 wherein the first circuit is coupled to receive a second transaction on an input/output interface and is configured to request the transaction in response thereto, and wherein the second transaction includes an isochronous indication, and wherein the first circuit is configured to generate the cache allocate indication responsive to the isochronous indication.

17. The apparatus as recited in claim 13 wherein the first circuit further comprises an address mapper configured to map a first address of received on an input/output interface to a second address of the first cache block, and wherein the address mapper is configured to generate the cache allocate indication.

18. The apparatus as recited in claim 17 wherein the address mapper is configured to map a portion of an address space including the first address, and wherein the first circuit is configured to transmit the cache allocate indication in a state indicating that the cache is not to allocate one of the plurality of cache block storage locations responsive to the first address being outside the portion.

19. The apparatus as recited in claim 13 wherein the first circuit is configured to initiate a plurality of transactions including the transaction in response to receiving a packet on a network interface, and wherein the first circuit is configured to determine the cache allocate indication for each transaction dependent on whether or not that transaction is within an initial number of the plurality of transactions.

20. A method comprising:
initiating a cacheable transaction, the initiating including transmitting a cache allocate indication indicating whether or not a cache on the interconnect is to allocate a cache block storage location to store the first cache block if the first cache block is a miss in the cache;
detecting a miss in the cache for the first cache block; and
selectively allocating storage in the cache responsive to detecting the miss and responsive to the cache allocate indication.

21. The method as recited in claim 20 further comprising responding to the transaction if the transaction is a hit in the cache, the responding independent of the cache allocate indication.

22. The method as recited in claim 20 further comprising generating the cache allocate indication responsive to whether or not the transaction is a prefetch.

23. The method as recited in claim 20 further comprising generating the cache allocate indication responsive to a cache attribute of a page including the first cache block.

24. The method as recited in claim 20 further comprising:
requesting the transaction responsive to a second transaction received on an input/output interface, the second transaction including an isochronous indication; and generating the cache allocate indication responsive to the isochronous indication.

25. The method as recited in claim 20 further comprising transmitting a plurality of transactions including the transaction in response to receiving a packet on a network interface, wherein an initial number of the plurality of transactions include the cache allocate indication indicating that the cache is to allocate one of the cache block storage locations.

26. The method as recited in claim 25, wherein a remaining number of the plurality of transactions include the cache allocate indication indicating that the cache is not to allocate one of the cache block storage locations.

27. A carrier medium comprising a database used by a program in an integrated circuit fabrication process, the database representing:

an agent configured to initiate a cacheable transaction addressing a first cache block;

a cache coupled to receive the transaction, the cache including a plurality of cache block storage locations for storing cache blocks;

wherein the agent is configured to transmit a cache allocate indication in an initial transmission of the transaction, wherein the cache allocate indication indicates whether or not the cache is to allocate one of the plurality of cache block storage locations to store the first cache block if the transaction is a miss in the cache; and wherein the cache, if the transaction is a miss, is configured to selectively allocate one of the plurality of cache block storage locations to store the first cache block responsive to the cache allocate indication.

28. The carrier medium as recited in claim 27 wherein the cache, if the transaction is a hit in a first cache block storage location of the plurality of cache block storage locations, is configured to receive the first cache block into the first cache block storage location or provide the first cache block from the first cache block storage location in response to the transaction independent of the cache allocate indication.

29. The carrier medium as recited in claim 27 wherein the agent and the cache are coupled to an interconnect, and wherein the agent is configured to initiate the transaction on the interconnect, and wherein the cache is configured to receive the transaction from the interconnect.

30. The carrier medium as recited in claim 29 wherein the transaction includes at least an address phase and a data phase on the interconnect, and wherein the agent is configured to transmit the cache allocate indication during the address phase.

31. The carrier medium as recited in claim 27 wherein the agent comprises a processor, and wherein the transaction is a prefetch, and wherein the processor transmits the cache allocate indication in a state indicating that the cache is to allocate one of the plurality of cache block storage locations to store the first cache block.

32. The carrier medium as recited in claim 27 wherein the agent comprises a processor, and wherein the transaction is a prefetch, and wherein the processor transmits the cache allocate indication in a state indicating that the cache is not to allocate one of the plurality of cache block storage locations to store the first cache block.

33. The carrier medium as recited in claim 27 wherein the agent comprises a processor including a translation lookaside buffer (TLB), and wherein the TLB is configured to store a cache attribute corresponding to a page including the first cache block, and wherein the processor is configured to generate the cache allocate indication responsive to the cache attribute.

34. The carrier medium as recited in claim 27 wherein the agent is configured to perform the transaction in response to a second transaction on an input/output interface, and wherein the second transaction includes an isochronous indication, and wherein the agent is configured to generate the cache allocate indication responsive to the isochronous indication.

35. The carrier medium as recited in claim 27 wherein the database further represents an address mapper configured to map a first address received on an input/output interface to a second address of the first cache block, and wherein the address mapper is configured to generate the cache allocate indication.

36. The carrier medium as recited in claim 35 wherein the address mapper is configured to map a portion of an address space including the first address, and wherein the agent is configured to transmit the cache allocate indication in a state indicating that the cache is not to allocate one of the plurality of cache block storage locations responsive to the first address being outside the portion.

37. The carrier medium as recited in claim 27 wherein the agent is configured to initiate a plurality of transactions including the transaction in response to receiving a packet on a network interface, and wherein the agent is configured to transmit an initial number of the plurality of transactions with the cache allocate indication in a first state indicating that the cache is to allocate one of the cache block storage locations, and wherein the agent is configured to transmit the cache allocate indication for the transaction in the first state if the transaction is one of the initial number of the plurality of transactions.

38. The carrier medium as recited in claim 37 wherein the agent is configured to transmit a remaining number of the plurality of transactions with the cache allocate indication in a second state indicating that the cache is not to allocate one of the cache block storage locations, and wherein the agent is configured to transmit the cache allocate indication for the transaction in the second state if the transaction is one of the remaining number of transactions.

* * * * *